US011296592B2

(12) United States Patent
Ishikura et al.

(10) Patent No.: US 11,296,592 B2
(45) Date of Patent: Apr. 5, 2022

(54) SWITCHING CONVERTER

(71) Applicant: Murata Manufacturing Co., Ltd., Nagaokakyo (JP)

(72) Inventors: Yuki Ishikura, Nagaokakyo (JP); Tatsuya Hosotani, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/238,257

(22) Filed: Apr. 23, 2021

(65) Prior Publication Data

US 2021/0242769 A1 Aug. 5, 2021

Related U.S. Application Data

(63) Continuation of application No. PCT/JP2019/042250, filed on Oct. 29, 2019.

(30) Foreign Application Priority Data

| Nov. 1, 2018 | (JP) | JP2018-206433 |
| Jan. 24, 2019 | (JP) | JP2019-010319 |
| Jul. 8, 2019 | (JP) | JP2019-126745 |

(51) Int. Cl.
  *H02M 1/08* (2006.01)
  *H02M 1/088* (2006.01)
  *H02M 1/34* (2007.01)

(52) U.S. Cl.
  CPC ............ *H02M 1/088* (2013.01); *H02M 1/346* (2021.05)

(58) Field of Classification Search
  CPC ........ H02M 1/08; H02M 1/088; H02M 1/096; H02M 1/346; H02M 1/34; H02M 1/32
  See application file for complete search history.

(56) References Cited

U.S. PATENT DOCUMENTS

| 2009/0195068 A1 | 8/2009 | Ohashi et al. |
| 2012/0069604 A1 | 3/2012 | Yagyu et al. |
| 2019/0260306 A1 | 8/2019 | Ma |
| 2020/0244175 A1* | 7/2020 | Mahdavikhah-Mehrabad ............ H02M 3/335 |
| 2021/0242768 A1* | 8/2021 | Ishikura .............. H02M 1/0006 |
| 2021/0408943 A1* | 12/2021 | Maki ................. H02M 7/53871 |

FOREIGN PATENT DOCUMENTS

| JP | 2000-324799 A | 11/2000 |
| JP | 2001-161059 A | 6/2001 |
| JP | 2009-177951 A | 8/2009 |
| JP | 2012-070467 A | 4/2012 |
| JP | 2014-033614 A | 2/2014 |
| WO | 2018/131384 A1 | 7/2018 |

OTHER PUBLICATIONS

Official Communication issued in International Patent Application No. PCT/JP2019/042250, dated Jan. 21, 2020.

\* cited by examiner

*Primary Examiner* — Adolf D Berhane
(74) *Attorney, Agent, or Firm* — Keating & Bennett, LLP

(57) ABSTRACT

A switching converter includes a controller configured or programmed to detect voltages of snubber capacitors, a voltage of a first capacitor, and a voltage of a second capacitor using voltage sensors. The controller adjusts the turn-off timings of switches based on the voltages of the snubber capacitors, the voltage between terminals of the first capacitor, and the voltage of the second capacitor.

18 Claims, 14 Drawing Sheets

SWITCHING CONVERTER

CROSS REFERENCE TO RELATED APPLICATIONS

This application claims the benefit of priority to Japanese Patent Application No. 2018-206433 filed on Nov. 1, 2018, Japanese Patent Application No. 2019-010319 filed on Jan. 24, 2019, and Japanese Patent Application No. 2019-126745 filed on Jul. 8, 2019 and is a Continuation Application of PCT Application No. PCT/JP2019/042250 filed on Oct. 29, 2019. The entire contents of each application are hereby incorporated herein by reference.

BACKGROUND OF THE INVENTION

1. Field of the Invention

The present disclosure relates to a switching converter.

2. Description of the Related Art

In the prior art, a switching converter includes a power conversion circuit, in which switches are connected in series, and drive circuits connected in correspondence with the switches (for example, refer to Japanese Laid-Open Patent Publication No. 2014-33614).

In a switching converter that simultaneously turns on and off the series-connected switches, the parasitic capacitance between terminals differs between the switches. Thus, when the switches are turned off, the time for extracting charge from between the gate and source differs between the switches. This produces a difference in the drain-source voltage Vds between the switches after being turned off. Thus, although the output voltage Vout needs to be uniformly distributed to the switches, voltage may be applied in a non-uniform manner to the switches.

SUMMARY OF THE INVENTION

Preferred embodiments of the present invention provide switching converters that each reduce the difference in the drain-source voltage between the series-connected switches.

A switching converter according to a preferred embodiment of the present invention includes first input/output portions to which a first voltage is applied and second input/output portions to which a second voltage, which is lower than the first voltage, is applied; a switch circuit including first and second switch groups, each including n, where n is an integer that is greater than or equal to 2, switches connected in series, that are connected in series between the first input/output portions in order of the first switch group and the second switch group from one of the first input/output portions that is at a lower potential side; an inductor connected to one of the second input/output portions that is at a higher potential side and connected in series to the first switch group between the second input/output portions; a first capacitor connected between the second input/output portions and connected in parallel to the first switch group; a second capacitor connected between the first input/output portions and connected in parallel to the switch circuit; a snubber circuit including snubber capacitors respectively connecting mth ones, where 1≤m≤n−1, of connection points between the switches of the first switch group and connection points between the switches of the second switch group from a connection point between the first switch group and the second switch group; and a controller configured or programmed to turn off a gate terminal of each of the switches in the first and second switch groups, wherein the controller detects voltages at the snubber capacitors, a voltage at the first capacitor, and a voltage at the second capacitor and adjusts a time at which a gate terminal of each of the switches is turned off based on the voltages at the snubber capacitor, the voltage at the first capacitor, and the voltage at the second capacitor.

With this structure, the controller detects the voltages at the snubber capacitors, the voltage at the first capacitor, and the voltage at the second capacitor and delays the time at which the gate terminal of each switch is turned off based on the voltages at the snubber capacitor, the voltage at the first capacitor, and the voltage at the second capacitor to reduce differences in the drain-source voltage Vds of the switches.

A switching converter according to a preferred embodiment of the present invention includes first input/output portions to which a first voltage is applied and second input/output portions to which a second voltage, which is lower than the first voltage, is applied; a switch circuit including a switch group, including n, where n is an integer that is greater than or equal to 2, switches connected in series, and a diode group, including n, where n is an integer that is greater than or equal to 2, diode elements connected in series, that are connected in series between the first input/output portions; a first capacitor connected between the second input/output portions and connected in parallel to the switch group or the diode group; a second capacitor connected between the first input/output portions and connected in parallel to the switch circuit; a snubber circuit including snubber capacitors respectively connecting mth ones, where 1≤m≤n−1, of connection points between the switches of the switch group and connection points between the diode elements of the diode group from a connection point between the switch group and the diode group; and a controller configured or programmed to turn off a gate terminal of each of the switches in the switch group, wherein the controller detects voltages at the snubber capacitors, a voltage at the first capacitor, and a voltage at the second capacitor and adjusts a time at which a gate terminal of each of the switches is turned off based on the voltages at the snubber capacitor, the voltage at the first capacitor, and the voltage at the second capacitor.

With this structure, the controller detects the voltages at the snubber capacitors, the voltage at the first capacitor, and the voltage at the second capacitor and delays the time at which the gate terminal of each switch is turned off based on the voltages at the snubber capacitor, the voltage at the first capacitor, and the voltage at the second capacitor to reduce differences in the drain-source voltage Vds of the switches.

A switching converter according to a preferred embodiment of the present invention includes first input/output portions to which a first voltage is applied and second input/output portions to which a second voltage, which is lower than the first voltage, is applied; a switch circuit including first and second switch groups, each including n, where n is an integer that is greater than or equal to 2, switches connected in series, that are connected in series between the first input/output portions in order of the first switch group and the second switch group from one of the first input/output portions that is at a lower potential side; an inductor connected to one of the second input/output portions that is at a higher potential side and connected in series with the first switch group and the second switch group between the second input/output portions; a first capacitor connected between the second input/output portions and connected in parallel to the first switch group; a second capacitor connected between the first input/output portions and connected in parallel to the switch circuit; a snubber circuit including snubber capacitors respectively connecting mth ones, where $1 \le m \le n-1$, of connection points between the switches of the first switch group and connection points between the switches of the second switch group from a connection point between the first switch group and the second switch group; a controller configured or programmed to turn off a gate terminal of each of the switches in the first and second switch groups; $2n-2$ voltage-control variable capacitance elements respectively connected to a stage preceding the gate terminals of the 2n switches connected in the first and second switch groups excluding the switch closest to the high potential side and the switch closest to the low potential side; wherein the controller detects voltages at the snubber capacitors and a voltage at the second capacitor and adjusts a time at which the gate terminal of each of the switches is turned off based on the voltages at the snubber capacitors and the voltage at the second capacitor.

With this structure, the controller detects the voltages at the snubber capacitors and the voltage at the second capacitor and delays the time at which the gate terminal of each switch is turned off based on the voltages at the snubber capacitor and the voltage at the second capacitor to reduce differences in the drain-source voltage Vds of the switches.

A switching converter according to a preferred embodiment of the present invention includes first input/output portions to which a first voltage is applied and second input/output portions to which a second voltage, which is lower than the first voltage, is applied; a switch circuit including first and second switch groups, each including n, where n is an integer that is greater than or equal to 2, switches connected in series, that are connected in series between the first input/output portions in order of the first switch group and the second switch group from one of the first input/output portions that is at a lower potential side; an inductor connected to one of the second input/output portions that is at a higher potential side and connected in series with the first switch group and the second switch group between the second input/output portions; a first capacitor connected between the second input/output portions and connected in parallel to the first switch group; a second capacitor connected between the first input/output portions and connected in parallel to the switch circuit; a snubber circuit including snubber capacitors respectively connecting mth ones, where $1 \le m \le n-1$, of connection points between the switches of the first switch group and connection points between the switches of the second switch group from a connection point between the first switch group and the second switch group; a controller configured or programmed to turn off a gate terminal of each of the switches in the first and second switch groups; $2n-2$ of voltage-control variable capacitance elements respectively connected to a stage preceding the gate terminals of the 2n switches connected in the first and second switch groups excluding the switch closest to the high potential side and the switch closest to the low potential side; and a voltage adjustment circuit to apply adjustment voltages to the $2n-2$ voltage-control variable capacitance elements based on voltages at the snubber capacitors and the voltage at the second capacitor.

With this structure, the controller detects the voltages at the snubber capacitors and the voltage at the second capacitor and delays the time at which the gate terminal of each switch is turned off based on the voltages at the snubber capacitor and the voltage at the second capacitor to reduce differences in the drain-source voltage Vds of the switches.

The switching converters according to preferred embodiments of the present invention each reduce the difference in the drain-source voltage Vds between the switches.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments will now be described with reference to the drawings.

First Preferred Embodiment

Figure 1:
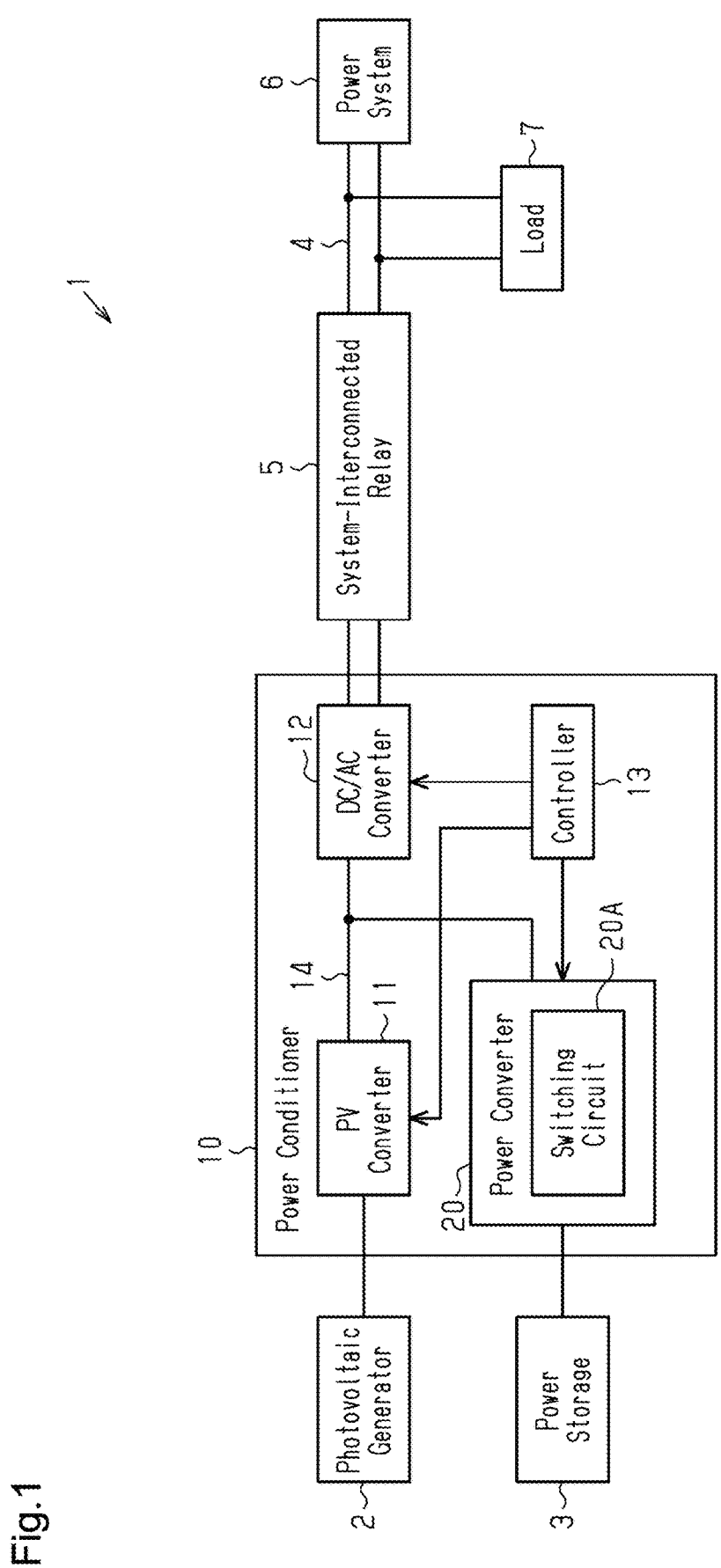
FIG. 1 is a diagram showing the configuration of a power management system including a switching circuit in accordance with a first preferred embodiment of the present invention.

As shown in FIG. 1, a power management system 1 includes a power conditioner 10, a photovoltaic generator 2, and a power storage 3. The photovoltaic generator 2 and the power storage 3 are electrically connected to the power conditioner 10. The power conditioner 10 is connected by an AC bus 4 and a system-interconnected protection relay 5 to a power system 6. A load 7 is connected by, for example, a distribution board or the like (not shown) to the AC bus 4 at the outer side of the system-interconnected protection relay 5 as viewed from the power conditioner 10. The system-interconnected protection relay 5 allows the power system 6 and the power conditioner 10 to be disconnected from each other. The load 7 is, for example, an indoor load such as a light, a refrigerator, a washing machine, an air conditioner, a microwave oven, or the like. The power management system 1 uses the power conditioner 10 to adjust power of the photovoltaic generator 2, the power storage 3, the power system 6, and the load 7. Examples of such adjustment include adjustments in a reverse power flow of the power generated by the photovoltaic generator 2 to the power system 6, the storage of power in the power storage 3, the supply of power to the load 7. Another example is the adjustment of the storage of the power from the power system 6 to the power storage 3 and the supply of the power to the load 7. In addition to the photovoltaic generator 2, for example, a wind generator, a gas power generator, a geo-thermal generator, or the like may be used as the generator device.

The photovoltaic generator 2 includes a photovoltaic panel (not shown) and supplies the DC power generated by the photovoltaic panels to the power conditioner 10. The photovoltaic generator 2 executes, for example, Maximum Power Point Tracking (MPPT) control that extracts current at the output voltage at which the power output by the photovoltaic panel is the maximum.

The power storage 3 includes rechargeable batteries that are connected in series. The power conditioner 10 controls charging and discharging of the power storage 3.

The power conditioner 10 includes a PV converter 11, a DC/AC converter 12, a controller 13 that defines a portion of a switching converter, and a power converter 20 that defines a portion of the switching converter. The PV converter 11, the DC/AC converter 12, and the power converter 20 are each connected to a high-voltage DC bus 14. Thus, the PV converter 11, the DC/AC converter 12, and the power converter 20 are connected to one another by the high-voltage DC bus 14.

The photovoltaic generator 2 is connected to the PV converter 11. The PV converter 11 executes MPPT control with the photovoltaic generator 2 to output power to the high-voltage DC bus 14. The power is varied by sunlight conditions, such as the season, weather, and time, for example. The output voltage output from the PV converter 11 to the high-voltage DC bus 14 is, for example, about 380 V. The DC/AC converter 12 is connected to the AC bus 4. The DC/AC converter 12 converts the DC power from the high-voltage DC bus 14 to AC power having an effective value of about 200 V and outputs the AC power to the AC bus 4. Further, the DC/AC converter 12 converts the AC power from the AC bus 4 to DC power having a set voltage and outputs the DC power to the high-voltage DC bus 14.

The power converter 20 converts the DC power from the high-voltage DC bus 14 to DC power that charges the power storage 3. Further, the power converter 20 converts the DC power discharged from the power storage 3 to DC power having voltage set in correspondence with the high-voltage DC bus 14. In the present preferred embodiment, the power converter 20 is a bidirectional DC/DC converter, for example.

The controller 13 is connected to the PV converter 11, the DC/AC converter 12, and the power converter 20 in a manner that enables communication to control operation of each of the PV converter 11, the DC/AC converter 12, and the power converter 20. The controller 13 includes one or more microcomputers 13a and a D/A converter 13b. The microcomputer 13a includes a processor that executes pre-determined control programs. The processor includes, for example, a Central Processing Unit (CPU) or a Micro-Processing Unit (MPU). The controller 13 may include a plurality of processors located at separate positions. The controller 13 further includes storage. The storage stores various types of control programs and information used for various types of processes. The storage includes, for example, a nonvolatile memory and a volatile memory. The storage may be, for example, a non-transitory computer-readable medium that stores control programs.

Figure 2:
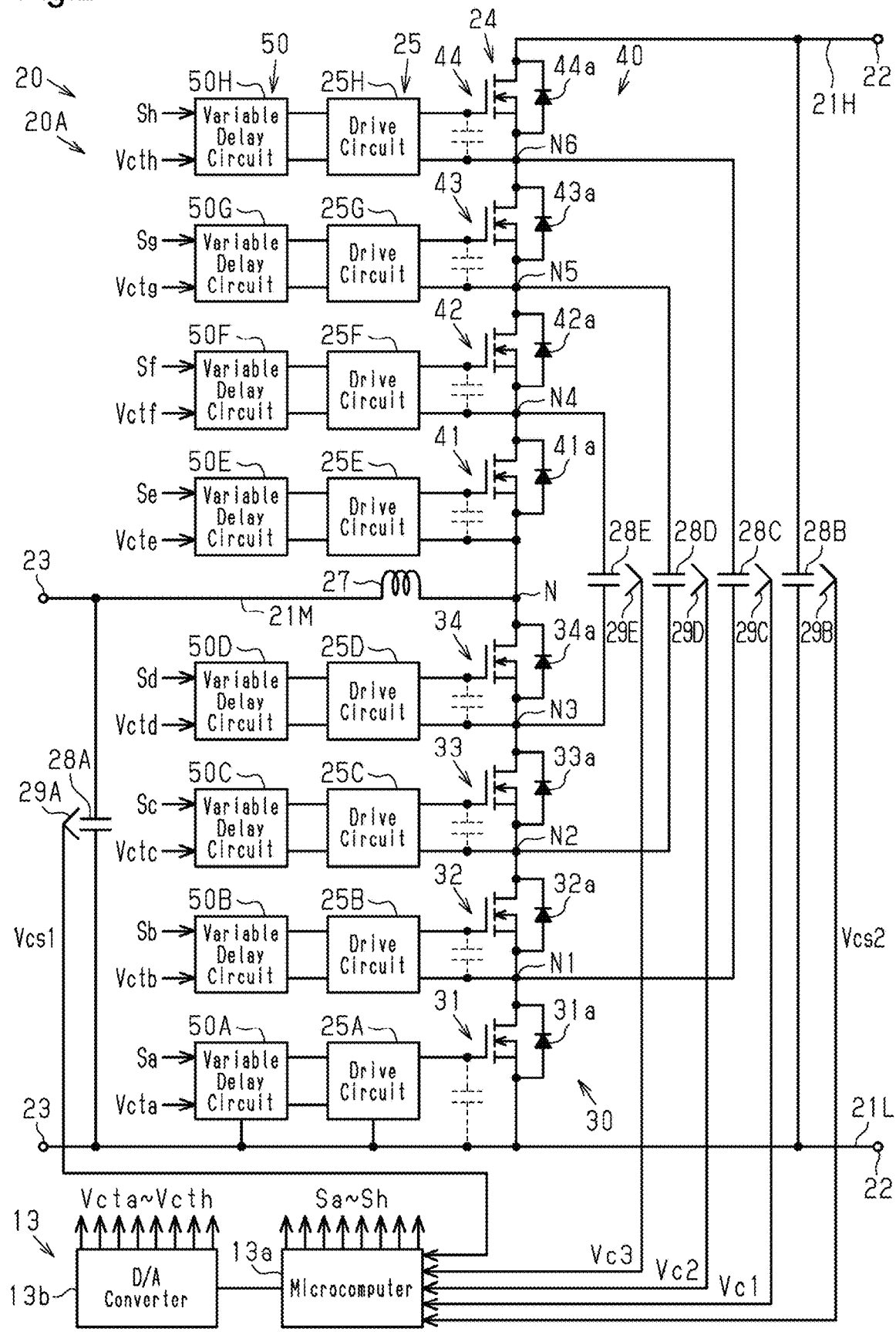
FIG. 2 is a circuit diagram of the switching circuit in accordance with the first preferred embodiment of the present invention.

As shown in FIG. 2, the power converter 20 includes a switching circuit 20A. The switching circuit 20A includes first input/output portions 22 and second input/output portions 23. The first input/output portions 22 include two first input/output terminals connected to the high-voltage DC bus 14 shown in FIG. 1, and the second input/output portions 23 include two input/output terminals connected to the power storage 3 shown in FIG. 1.

The switching circuit 20A includes a first wire 21L, a second wire 21H, and a third wire 21M. The one of the first input/output portions 22 at a low-potential side and the one of the second input/output portions 23 at a low-potential are both connected to the first wire 21L, which has, for example, ground potential. The second input/output portions 23 are connected to the power storage 3 shown in FIG. 1. The first input/output portions 22 are connected to the high-voltage DC bus 14 shown in FIG. 1. The voltage applied to both of the second input/output portions 23 is the voltage at the power storage 3 (e.g., about 200 V) and lower than the voltage applied to both of the first input/output portions 22, namely, the voltage at the high-voltage DC bus 14 (e.g., about 380 V).

The power converter 20 includes a switch circuit 24, a drive circuit (driver) 25, and a variable delay circuit 50. The switch circuit 24 includes first and second switch groups 30 and 40 connected in series between the first wire 21L and the second wire 21H. The drive circuit 25 drives the switch circuit 24. The microcomputer 13a of the controller 13 outputs control signals to the variable delay circuit 50 to turn on and off the first and second switch groups 30 and 40 of the switch circuit 24. The microcomputer 13a outputs adjustment signals (digital signals) to the D/A converter 13b to adjust the delay time of the variable delay circuit 50. The D/A converter 13b of the controller 13 outputs adjustment voltages Vcta to Vcth, which correspond to the adjustment signals, as instruction value signals to the variable delay circuit 50.

A connection node N between the first switch group 30 and the second switch group 40 is connected to the third wire 21M. The third wire 21M is connected by an inductor 27 to the high-voltage second input/output portion 23. The low-voltage second input/output portion 23 is connected to the first wire 21L.

The first switch group 30 includes n, where n is an integer that is greater than or equal to 2, of first switches 31 to 34 connected in series between the connection node N and the first wire 21L. Each of the first switches 31 to 34 is preferably, for example, an n-type metal-oxide-semiconductor field-effect transistor (MOSFET). In the present preferred embodiment, MOSFETs including silicon (Si) or gallium nitride (GaN), for example, are preferably used as the first switches 31 to 34. The first switches 31 to 34 include body diodes 31a to 34a, respectively. The first switches 31 to 34 are arranged in the order of the first switch 31, the first switch 32, the first switch 33, and the first switch 34 from the low potential side toward the high potential side. The source of the first switch 31 is connected to the first wire 21L. The drain of the first switch 31 is connected to the source of the first switch 32. The drain of the first switch 32 is connected to the source of the first switch 33. The drain of the first switch 33 is connected to the source of the first switch 34. The drain of the first switch 34 is connected to the connection node N.

The second switch group 40 includes n, where n is an integer that is greater than or equal to 2, of second switches 41 to 44 connected in series between the connection node N and the second wire 21H. Each of the second switches 41 to 44 is preferably, for example, an nMOSFET. In the present preferred embodiment, MOSFETs including silicon (Si) or gallium nitride (GaN), for example, are preferably used as the second switches 41 to 44. The second switches 41 to 44 include body diodes 41a to 44a, respectively. The second switches 41 to 44 are arranged in the order of the second switch 41, the second switch 42, the second switch 43, and the second switch 44 from the low potential side toward the high potential side. The source of the second switch 41 is connected to the connection node N. The drain of the second switch 41 is connected to the source of the second switch 42. The drain of the second switch 42 is connected to the source of the second switch 43. The drain of the second switch 43 is connected to the source of the second switch 44. The drain of the second switch 44 is connected to the second wire 21H.

The drive circuit 25 includes a plurality of (for example, eight in the present preferred embodiment) of drive circuits 25A to 25H that drive the first switches 31 to 34 of the first switch group 30 and the second switches 41 to 44 of the second switch group 40.

The drive circuit 25A is connected to the gate of the first switch 31 and the first wire 21L. The drive circuit 25B is connected to the gate of the first switch 32 and a connection node N1 between the first switch 31 and the first switch 32. The drive circuit 25C is connected to the gate of the first switch 33 and a connection node N2 between the first switch 32 and the first switch 33. The drive circuit 25D is connected to the gate of the first switch 34 and a connection node N3 between the first switch 33 and the first switch 34.

The drive circuit 25E is connected to the gate of the second switch 41 and the connection node N. The drive circuit 25F is connected to the gate of the first switch 42 and a connection node N4 between the second switch 41 and the second switch 42. The drive circuit 25G is connected to the gate of the first switch 43 and a connection node N5 between the second switch 42 and the second switch 43. The drive circuit 25H is connected to the gate of the first switch 44 and a connection node N6 between the second switch 43 and the second switch 44.

The drive circuits 25A to 25H are connected to variable delay circuits 50A to 50H, respectively.

The variable delay circuits 50A to 50H are each connected to the microcomputer 13a and the D/A converter 13b of the controller 13.

The microcomputer 13a outputs control signals Sa to Sh to the variable delay circuits 50A to 50H to turn on and off the switches 31 to 34 and 41 to 44 via the drive circuits 25A to 25H, respectively. The D/A converter 13b outputs the adjustment voltages Vcta to Vcth (analog signals), which are generated by performing digital-to-analog conversion on the adjustment signals (digital signals) output from the microcomputer 13a, to the variable delay circuits 50A to 50H.

Figure 3:
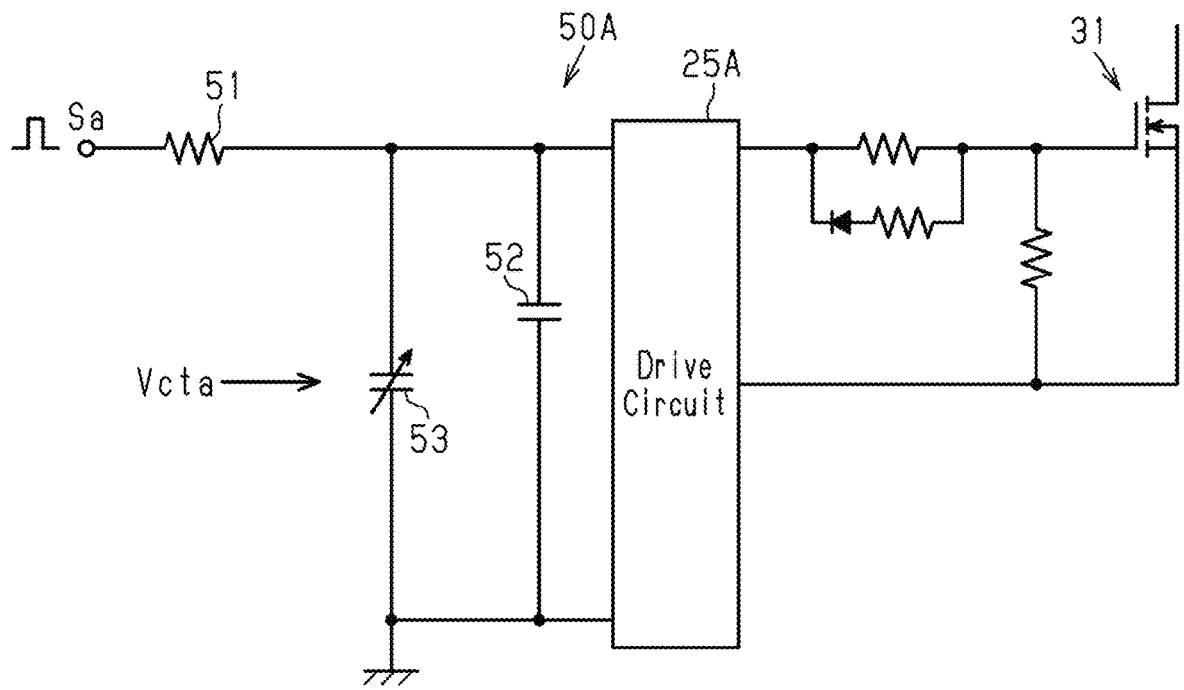
FIG. 3 is a circuit diagram of a variable delay circuit in the first preferred embodiment of the present invention.
Figure 4:
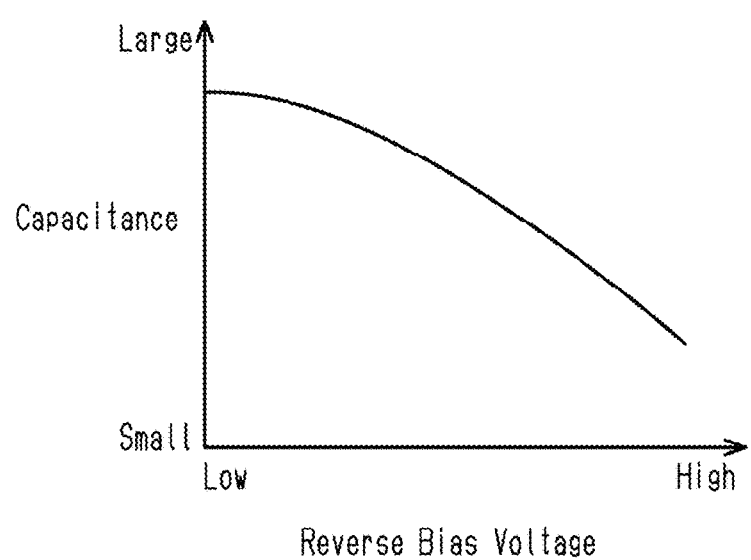
FIG. 4 is a waveform diagram illustrating the relationship of a of the reverse bias voltage and the capacitance in the variable delay circuit of the first preferred embodiment of the present invention.

As shown in FIG. 3, the variable delay circuit 50A includes an RC circuit including a resistor 51 and capacitors 52 and 53. The capacitors 52 and 53 are connected in parallel to each other. One of the capacitors 52 and 53, namely, the capacitor 53, is a voltage-control variable capacitance element of which the capacitance is varied in accordance with the adjustment voltage Vcta that is output as reverse bias voltage from the D/A converter 13b, as shown in FIG. 4. One example of the capacitor 53 is a varicap diode. Thus, in accordance with a time-constant that is based on the capacitance obtained by combining the capacitors 52 and 53 and the resistance of the resistor 51, the variable delay circuit 50A delays the control signal Sa to produce an output signal. Further, the variable delay circuit 50A varies the time at which the output signal is output with respect to the control signal Sa by varying the capacitance of the capacitor 53 with the adjustment voltage Vcta. Accordingly, the time for turning on and turning off the switch 31, which is connected to the drive circuit 25A, can be varied by the output signal of the variable delay circuit 50A. The other variable delay circuits 50B to 50H have the same or substantially the same configuration as the variable delay circuit 50A and thus will not be described nor illustrated in the drawings.

The switching circuit 20A further includes capacitors 28A to 28E. A first terminal of the capacitor 28A is connected to the first wire 21L, and a second terminal of the capacitor 28A is connected to the third wire 21M. Thus, the capacitor 28A is connected in parallel to the first switch group 30. A first terminal of the capacitor 28B is connected to the first wire 21L, and a second terminal of the capacitor 28B is connected to the second wire 21H. Thus, the capacitor 28B is connected in parallel to the switch circuit 24. The capacitors 28A and 28B are smoothing capacitors.

A first terminal of the capacitor 28C is connected to the connection node N1, and a second terminal of the capacitor 28C is connected to the connection node N6. The connection node N1 and the connection node N6 are both the third one of the connection points from the connection node N of the first switch group 30 and the second switch group 40. A first terminal of the capacitor 28D is connected to the connection node N2, and a second terminal of the capacitor 28D is connected to the connection node N5. The connection node N2 and the connection node N5 are both the second one of the connection points from the connection node N of the first switch group 30 and the second switch group 40. A first terminal of the capacitor 28E is connected to the connection node N3, and a second terminal of the capacitor 28E is connected to the connection node N4. The connection node N3 and the connection node N4 are both the first one of the connection points from the connection node N of the first switch group 30 and the second switch group 40. The capacitors 28C to 28E are snubber capacitors.

The switching circuit 20A further includes voltage sensors 29A to 29E that measure the voltage at the capacitors 28A to 28E, respectively. The measurement values of the voltage sensors 29A to 29E are input to the microcomputer 13a of the controller 13. In the description hereafter, the measurement of the voltage sensor 29A will be referred to as the measurement value Vcs1, and the measurement of the voltage sensor 29B will be referred to as the measurement value Vcs2. Further, the measurement of the voltage sensor 29C will be referred to as the measurement value Vc1, the measurement of the voltage sensor 29D will be referred to as the measurement value Vc2, and the measurement of the voltage sensor 29E will be referred to as the measurement value Vc3.

The controller 13 controls the switching circuit 20A in a step-up mode or a step-down mode. The step-up mode increases the output voltage at the power storage 3 shown in FIG. 1 to the voltage at the high-voltage DC bus 14, and the step-down mode decreases the voltage at the high-voltage DC bus 14 to voltage corresponding to the power storage 3. The microcomputer 13a of the controller 13 detects the voltage across the terminals of the power storage 3 shown in FIG. 1 with the voltage sensor 29A as the voltage at the capacitor 28A. Further, the microcomputer 13a detects the voltage at the high-voltage DC bus 14 shown in FIG. 1 with the voltage sensor 29B as the voltage at the capacitor 28B. In the step-up mode, the microcomputer 13a on-off controls the switches 31 to 34 and 41 to 44 based on the detection voltage of the voltage sensor 29A and the detection voltage of the voltage sensor 29B so that the voltage at the capacitor 28B corresponds to the voltage at the high-voltage DC bus 14. In the step-down control, the microcomputer 13a on-off controls the switches 31 to 34 and 41 to 44 based on the detection voltage of the voltage sensor 29A and the detection voltage of the voltage sensor 29B so that the voltage at the capacitor 28A corresponds to the voltage at the power storage 3.

MOSFETs having the same or substantially the same specification are used as the switches 31 to 34 and 41 to 44 of the switch circuit 24 in accordance with the present preferred embodiment. In this case, the phrase having the same or substantially the same specification means that the electric characteristics are the same in design (theoretically).

Even if switches have the same or substantially the same electrical characteristics, or specification, the parasitic capacitance produced between terminals (gate-source, drain-source, and drain-gate) may differ between the switches 31 to 34 and 41 to 44. Thus, if a control signal for turning on or off a switch is simultaneously input to the gates of the switching elements, each switch may be turned on or off at a time that differs from when the other switches are turned on or off. In this regard, the controller 13 in accordance with the present preferred embodiment is configured to detect the voltages at the capacitors 28A to 28E and execute delay adjustment control that adjusts the time at which the switches 31 to 34 and 41 to 44 are turned off based on the detected voltages.

One example of the delay adjustment performed by the controller 13 will now be described with reference to FIGS. 5 and 6.

The controller 13 in accordance with the present preferred embodiment determines whether the power converter 20 is being actuated in the step-up mode or the step-down mode to execute delay adjustment control in accordance with each mode.

The step-up mode will first be described.

In the step-up mode, when the switches 31 to 34 are turned off and the switches 41 to 44 are turned on, the high-potential terminal (upper terminal in FIG. 2) of each of the capacitors 28B to 28E is connected to node N. In this state, the voltage Vc3 at the capacitor 28E is the voltage between node N and node N3, that is, the voltage between the drain of the switch and the source of the switch 34. The voltage Vc2 at the capacitor 28D is the voltage between node N and node N2, that is, the voltage between the drain of the switch 34 and the source of the switch 33. The voltage Vc1 at the capacitor 28C is the voltage between node N and node N1, that is, the voltage between the drain of the switch 34 and the source of the switch 32. The voltage Vcs2 at the capacitor 28B is the voltage between node N and the first wire 21L, that is, the voltage between the drain of the switch 34 and the source of the switch 31.

The drain-source voltage Vds of the switch 33 is obtained by subtracting the voltage Vc3 at the capacitor 28E from the voltage Vc2 at the capacitor 28D. In the same or substantially the same manner, the drain-source voltage Vds of the switch 32 is obtained by subtracting the voltage Vc2 at the capacitor 28D from the voltage Vc1 at the capacitor 28C. The drain-source voltage Vds of the switch 31 is obtained by subtracting the voltage Vc1 at the capacitor 28C from the voltage Vcs2 at the capacitor 28B.

When the switches 31 to 34 have the same or substantially the same characteristics (parasitic capacitance), the drain-source voltage Vds of each of the switches 31 to 34 is equal to about one quarter (one-fourth) of the voltage between node N and the first wire 21L. When the switches 31 to 34 have different characteristics, the switches 31 to 34 are turned on at different times thus varying the drain-source voltage Vds between the switches 31 to 34. Accordingly, the time for turning on each of the switches 31 to 34 is adjusted by detecting the voltages Vcs2, Vc1, Vc2, and Vc3 at the capacitors 28B, 28C, 28D, and 28E and setting the drain-source voltage Vds of the switches 31 to 34 to be equal to about one quarter (one-fourth) of the voltage between the first wire 21L and node N. This reduces the difference in the drain-source voltage Vds between the switches 31 to 34.

Figure 5:
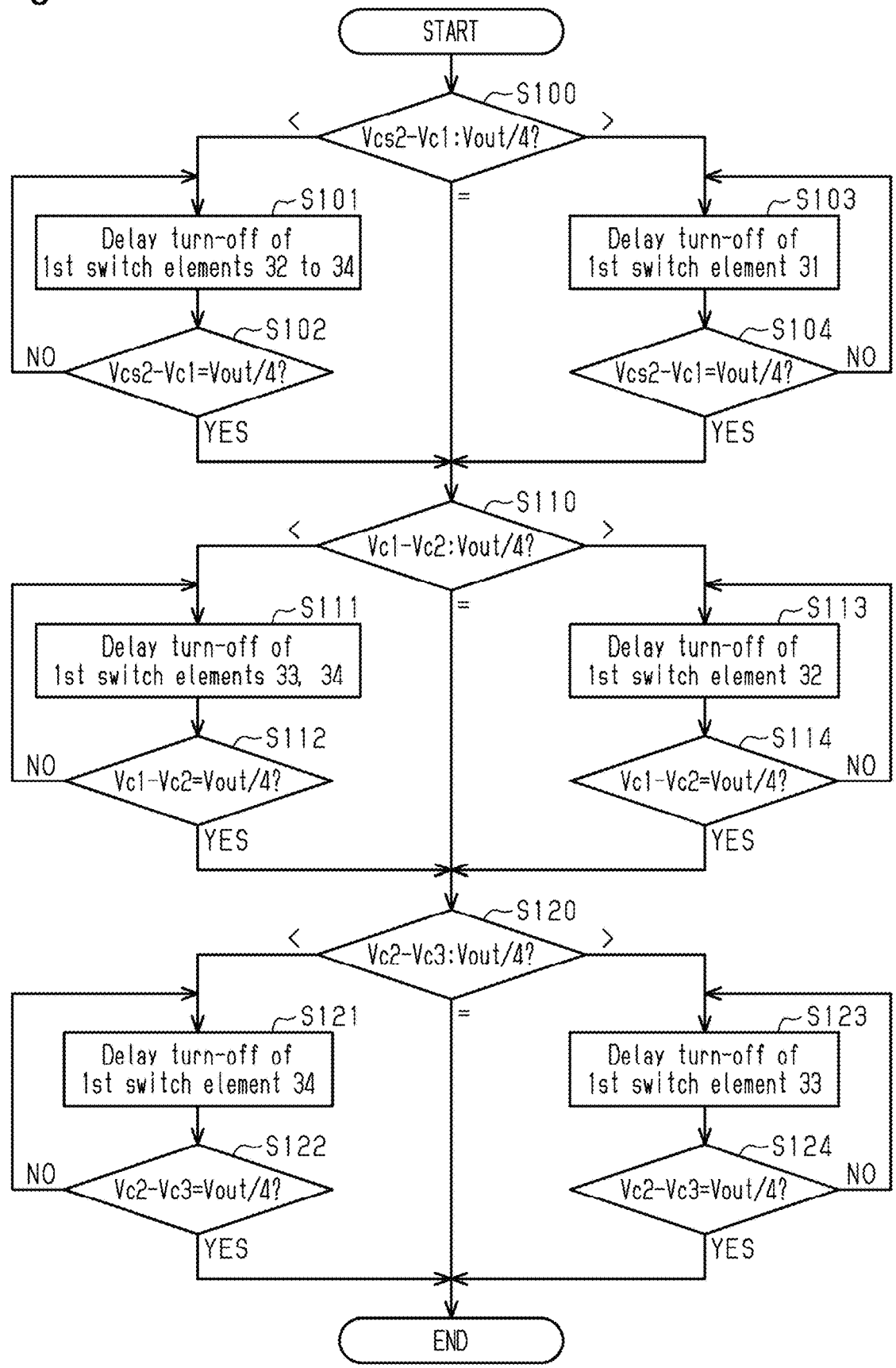
FIG. 5 is a flowchart showing an example of the control executed during a step-up mode.

In the step-up mode, the controller 13 executes the delay adjustment control illustrated in FIG. 5. In the delay adjustment control of FIG. 5, the voltage Vcs2 at the capacitor 28B detected by the voltage sensor 29B is referred to as the output voltage Vout.

As shown in FIG. 5, the controller 13 first compares Vcs2−Vc1 and Vout/4 (step S100).

When Vcs2−Vc1 is less than Vout/4 in step S100, the controller 13 delays the time at which the switches 32, 33, and 34 are turned off (step S101). The delay of the turn-off time may be a predetermined fixed period or a period varied in accordance with the difference of Vcs2−Vc1 and Vout/4. The same applies to the delay referred to in the other steps.

Then, the controller 13 determines whether Vcs2−Vc1 is equal to Vout/4 (step S102).

When Vcs2−Vc1 is not equal to Vout/4 (step S102: NO), the controller 13 returns to step S101. When Vcs2−Vc1 is equal to Vout/4 (step S102: YES), the controller 13 proceeds to step S110. In this manner, the controller 13 performs steps S101 and S102 to delay when the switches 32, 33, and 34 are turned off until Vcs2−Vc1 becomes equal to Vout/4.

When Vcs2−Vc1 is greater than Vout/4 in step S100, the controller 13 delays the time at which the switch 31 is turned off (step S103).

Then, the controller 13 determines whether Vcs2−Vc1 is equal to Vout/4 (step S104). When Vcs2−Vc1 is not equal to Vout/4 (step S104: NO), the controller 13 returns to step S103. When Vcs2−Vc1 is equal to Vout/4 (step S104: YES), the controller 13 proceeds to step S110. In this manner, the controller 13 performs steps S103 and S104 to delay when the switch 31 is turned off until Vcs2−Vc1 becomes equal to Vout/4.

When Vcs1−Vc2 is equal to Vout/4 in step S100, the controller 13 proceeds to step S110.

The controller 13 compares Vc1−Vc2 and Vout/4 (step S110).

When Vc1−Vc2 is less than Vout/4 in step S110, the controller 13 delays the time at which the switches 33 and 34 are turned off (step S111).

Then, the controller 13 determines whether Vc1−Vc2 is equal to Vout/4 (step S112).

When Vc1−Vc2 is not equal to Vout/4 (step S112: NO), the controller 13 returns to step S111. When Vc1−Vc2 is equal to Vout/4 (step S112: YES), the controller 13 proceeds to step S120. In this manner, the controller 13 performs steps S111 and S112 to delay when the switches 33 and 34 are turned off until Vc1−Vc2 becomes equal to Vout/4.

When Vc1−Vc2 is greater than Vout/4 in step S110, the controller 13 delays the time at which the switch 32 is turned off (step S113).

Then, the controller 13 determines whether Vc1−Vc2 is equal to Vout/4 (step S114).

When Vc1−Vc2 is not equal to Vout/4 (step S114: NO), the controller 13 returns to step S113. When Vc1−Vc2 is equal to Vout/4 (step S114: YES), the controller 13 proceeds to step S120. In this manner, the controller 13 performs steps S113 and S114 to delay when the switch 32 is turned off until Vc1−Vc2 becomes equal to Vout/4.

The controller 13 compares Vc2−Vc3 and Vout/4 (step S120).

When Vc2−Vc3 is less than Vout/4 in step S120, the controller 13 delays the time at which the switch 34 is turned off (step S121).

Then, the controller 13 determines whether Vc2−Vc3 is equal to Vout/4 (step S122).

When Vc2−Vc3 is not equal to Vout/4 (step S122: NO), the controller 13 returns to step S121. When Vc2−Vc3 is equal to Vout/4 (step S122: YES), the controller 13 ends the process. In this manner, the controller 13 performs steps S121 and S122 to delay when the switch 34 is turned off until Vc2−Vc3 becomes equal to Vout/4.

When Vc2−Vc3 is greater than Vout/4 in step S120, the controller 13 delays the time at which the switch 33 is turned off (step S123).

Then, the controller 13 determines whether Vc2−Vc3 is equal to Vout/4 (step S124).

When Vc2−Vc3 is not equal to Vout/4 (step S124: NO), the controller 13 returns to step S123. When Vc2−Vc3 is equal to Vout/4 (step S124: YES), the controller 13 ends the process. In this manner, the controller 13 performs steps S123 and S124 to delay when the switch 33 is turned off until Vc2−Vc3 becomes equal to Vout/4.

The step-down mode will now be described.

In the step-down mode, when the switches 31 to 34 are turned on and the switches 41 to 44 are turned off, the low-potential terminal (lower terminal in FIG. 2) of each of the capacitors 28B to 28E is connected to node N. In this state, the voltage Vc3 at the capacitor 28E is the voltage between node N4 and node N, that is, the voltage between the drain of the switch and the source of the switch 41. The voltage Vc2 at the capacitor 28D is the voltage between node N5 and node N, that is, the voltage between the drain of the switch 42 and the source of the switch 41. The voltage Vc1 at the capacitor 28C is the voltage between node N6 and node N, that is, the voltage between the drain of the switch 43 and the source of the switch 41. The voltage Vcs2 at the capacitor 28B is the voltage between the second wire 21H and node N, that is, the voltage between the drain of the switch 44 and the source of the switch 41.

The drain-source voltage Vds of the switch 42 is obtained by subtracting the voltage Vc3 at the capacitor 28E from the voltage Vc2 at the capacitor 28D. In the same or substantially the same manner, the drain-source voltage Vds of the switch 43 is obtained by subtracting the voltage Vc2 at the capacitor 28D from the voltage Vc1 at the capacitor 28C. The drain-source voltage Vds of the switch 44 is obtained by subtracting the voltage Vc1 at the capacitor 28C from the voltage Vcs2 at the capacitor 28B.

When the switches 41 to 44 have the same r substantially the same characteristics (parasitic capacitance), the drain-source voltage Vds of each of the switches 41 to 44 is equal to about one quarter (one-fourth) of the voltage between the second wire 21H and node N. When the switches 41 to 44 have different characteristics, the switches 41 to 44 are turned on at different times thus varying the drain-source voltage Vds between the switches 41 to 44. Accordingly, the time at which the switches 41 to 44 are turned on is adjusted by detecting the voltages Vcs2, Vc1, Vc2, and Vc3 at the capacitors 28B, 28C, 28D, and 28E and setting the drain-source voltage Vds of the switches 41 to 44 to be equal to about one quarter (one-fourth) of the voltage between the second wire 21H and node N. This reduces the difference in the drain-source voltage Vds between the switches 41 to 44.

Figure 6:
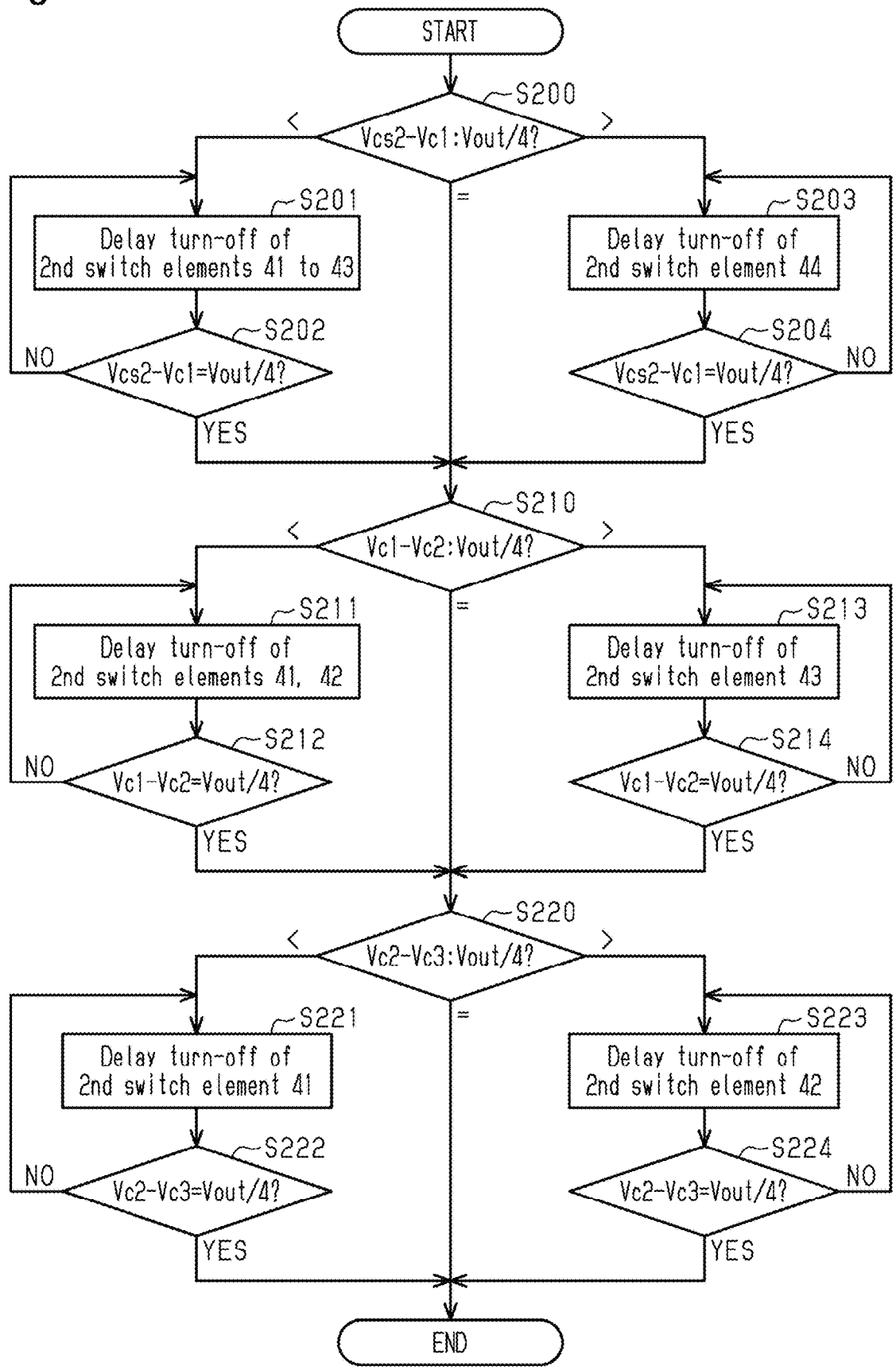
FIG. 6 is a flowchart showing an example of the control executed during a step-down mode.

In the step-down mode, the controller 13 executes the delay adjustment control illustrated in FIG. 6. The output voltage in the step-down mode is the voltage between the two second input-output terminals shown in FIG. 2 (second input/output portions 23). In the delay adjustment control illustrated in FIG. 6, the voltage Vcs2 at the capacitor 28B detected by the voltage sensor 29B is the output voltage Vout. Thus, in the step-up mode described above and the step-down mode described hereafter, the voltages Vcs2, Vc1, Vc2, and Vc3 of the same capacitors 28B, 28C, 28D, and 28E delay and adjust the control signal to reduce the difference in the drain-source voltage Vds between the switches 31 to 34, which are arranged between node N and the first wire 21L, and between the switches 41 to 44, which are arranged between node N and the second wire 21H.

As shown in FIG. 6, the controller 13 compares Vcs2−Vc1 and Vout/4 (step S200).

When Vcs2−Vc1 is less than Vout/4 in step S200, the controller 13 delays the time at which the switches 41, 42, and 43 are turned off (step S201). The delay of the turn-off time may be a predetermined fixed period or a period varied in accordance with the difference of Vcs2−Vc1 and Vout/4. The same applies to the delay referred to in the other steps.

Then, the controller 13 determines whether Vcs2−Vc1 is equal to Vout/4 (step S202).

When Vcs2−Vc1 is not equal to Vout/4 (step S202: NO), the controller 13 returns to step S201. When Vcs2−Vc1 is equal to Vout/4 (step S202: YES), the controller 13 proceeds to step S210. In this manner, the controller 13 performs steps S201 and S202 to delay when the switches 41, 42, and 43 are turned off until Vcs2−Vc1 becomes equal to Vout/4.

When Vcs2−Vc1 is greater than Vout/4 in step S200, the controller 13 delays the time at which the switch 44 is turned off (step S203).

Then, the controller 13 determines whether Vcs2−Vc1 is equal to Vout/4 (step S204). When Vcs2−Vc1 is not equal to Vout/4 (step S204: NO), the controller 13 returns to step S203. When Vcs2−Vc1 is equal to Vout/4 (step S204: YES), the controller 13 proceeds to step S210. In this manner, the controller 13 performs steps S203 and S204 to delay when the switch 44 is turned off until Vcs2−Vc1 becomes equal to Vout/4.

When Vcs2−Vc1 is equal to Vout/4 in step S200, the controller 13 proceeds to step S210.

The controller 13 compares Vc1−Vc2 and Vout/4 (step S210).

When Vc1−Vc2 is less than Vout/4 in step S210, the controller 13 delays the time at which the switches 41 and 42 are turned off (step S211).

Then, the controller 13 determines whether Vc1−Vc2 is equal to Vout/4 (step S212).

When Vc1−Vc2 is not equal to Vout/4 (step S212: NO), the controller 13 returns to step S211. When Vc1−Vc2 is equal to Vout/4 (step S212: YES), the controller 13 proceeds to step S220. In this manner, the controller 13 performs steps S211 and S212 to delay when the switches 41 and 42 are turned off until Vc1−Vc2 becomes equal to Vout/4.

When Vc1−Vc2 is greater than Vout/4 in step S210, the controller 13 delays the time at which the switch 43 is turned off (step S213).

Then, the controller 13 determines whether Vc1−Vc2 is equal to Vout/4 (step S214).

When Vc1−Vc2 is not equal to Vout/4 (step S214: NO), the controller 13 returns to step S213. When Vc1−Vc2 is equal to Vout/4 (step S214: YES), the controller 13 proceeds to step S220. Thus, the controller 13 performs steps S213 and S214 to delay when the switch 43 is turned off until Vc1−Vc2 becomes equal to Vout/4.

The controller 13 compares Vc2−Vc3 and Vout/4 (step S220).

When Vc2−Vc3 is less than Vout/4 in step S220, the controller 13 delays the time at which the switch 41 is turned off (step S221).

Then, the controller 13 determines whether Vc2−Vc3 is equal to Vout/4 (step S222).

When Vc2−Vc3 is not equal to Vout/4 (step S222: NO), the controller 13 returns to step S221. When Vc2−Vc3 is equal to Vout/4 (step S222: YES), the controller 13 ends the process. In this manner, the controller 13 performs steps S221 and S222 to delay when the switch 41 is turned off until Vc2−Vc3 becomes equal to Vout/4.

When Vc2−Vc3 is greater than Vout/4 in step S220, the controller 13 delays the time at which the switch 42 is turned off (step S223).

Then, the controller 13 determines whether Vc2−Vc3 is equal to Vout/4 (step S224).

When Vc2−Vc3 is not equal to Vout/4 (step S224: NO), the controller 13 returns to step S223. When Vc2−Vc3 is equal to Vout/4 (step S224: YES), the controller 13 ends the process. In this manner, the controller 13 performs steps S223 and S224 to delay when the switch 42 is turned off until Vc2−Vc3 becomes equal to Vout/4.

The operation of the present preferred embodiment will now be described.

The controller 13 in accordance with the present preferred embodiment determines whether the power converter 20 is being actuated in the step-up mode or the step-down mode to execute delay adjustment control in accordance with each mode. When determining that the power converter 20 is being actuated in the step-up mode, the controller 13 adjusts the time when to turn off or turn on gate signals provided to the switches 31 to 34 of the first switch group 30 by the drive circuits 25A to 25D. Further, when determining that the power converter 20 is being actuated in the step-down mode, the controller 13 adjusts the time when to turn off or turn on the gate signals provided to the switches 41 to 44 of the second switch group 40 by the drive circuits 25E to 25F.

An example illustrating the operation of the first switches 31 to 34 when turned off during the step-up mode will now be described. In this example, the first switches 32 to 34 each have the same or substantially the same output capacitance, and the first switch 31 has a greater output capacitance. Thus, when each gate signal is simultaneously turned off, the gate-source voltage Vgs of the first switch 31 becomes a mirror voltage before the gate-source voltage Vgs of the other first switches 32 to 34. Accordingly, the controller 13 executes the delay adjustment control to determine the voltage deviation from the ideal state of Vc1=3Vout/4, Vc2=Vout/2, Vc3=Vout/4 and adjust the on-off control signal input to the gates of the switches 31 to 34.

Figure 7:
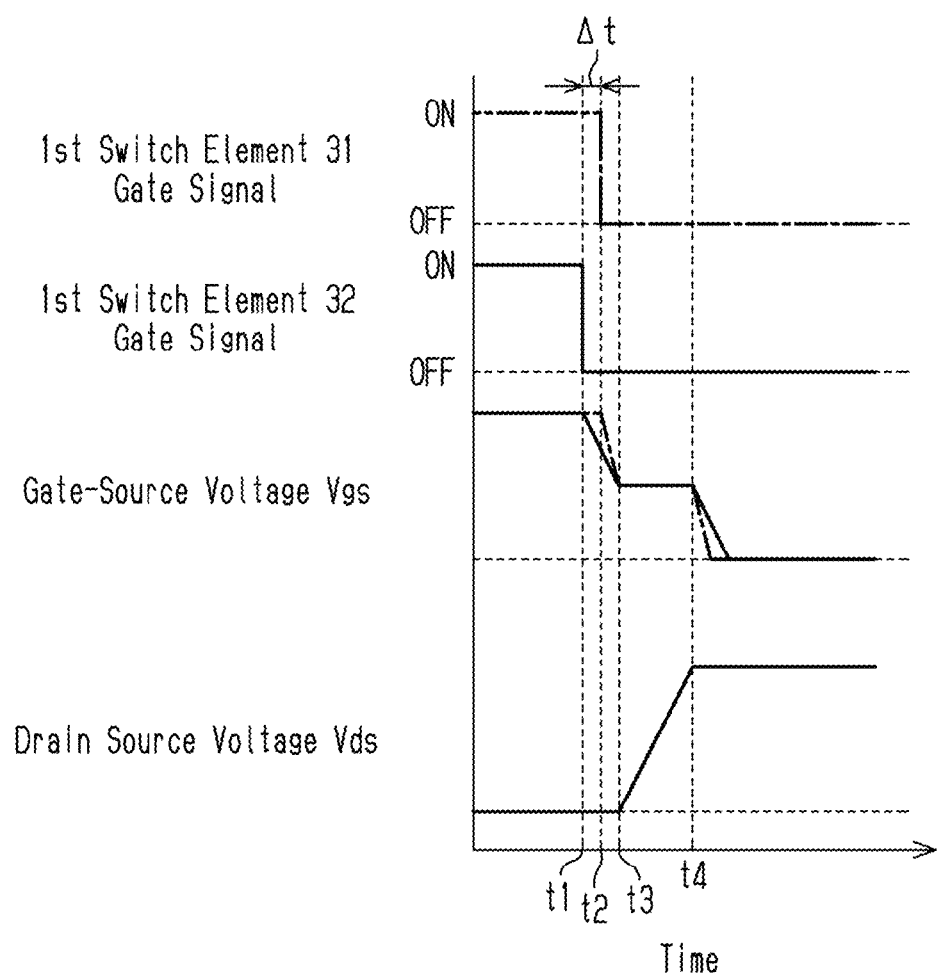
FIG. 7 is a time chart illustrating the delay time when a switch is turned off during the step-up mode.

Referring to FIG. 7, the controller 13 delays time t2, which is when the gate signal of the first switch 31 is turned off, by Δt from time t1, which is when the gate signal of the other first switch 32 is turned off. Thus, the gate-source voltage Vgs of the first switch 31 becomes a mirror voltage at the time t3, which is the same as when the gate-source voltage Vgs of the first switch 32 becomes a mirror voltage. This reduces the difference in the drain-source voltage Vds between the first switches 31 and 32 at time t4. The other switches undergo the same adjustment to reduce differences in the drain-source voltage Vds.

In the present preferred embodiment, the switches 31 to 34 and 41 to 44 are preferably defined by, for example, MOSFETs of Si substrates. This reduces the cost of the switching circuit 20A. In other words, costs may be reduced by using low-voltage switches.

The present preferred embodiment has the advantages described below.

(1-1) The controller 13 detects the voltages at the snubber capacitors 28C to 28E, the voltage at the capacitor 28A, and the voltage at the capacitor 28B with the voltage sensors 29A to 29E. The controller 13 adjusts the time at which the switches 31 to 34 and 41 to 44 are turned off based on the voltages at the capacitors 28C to 28E, the voltage at the capacitor 28A, and the voltage at the capacitor 28B. The difference in parasitic capacitance varies the time at which each switch is turned off. Thus, the output capacitance of each of the switches 31 to 34 and to 44 is compared with the voltages at the corresponding capacitor to adjust the time at which the switches 31 to 34 and to 44 are turned off based on the voltages. This reduces differences in the drain-source voltage Vds of the switches 31 to 34 and 41 to 44.

(1-2) The capacitor 53, which is a voltage-control variable capacitance element, is used so that the switches 31 to and 41 to 44 have uniform characteristics. This allows for execution of control that does not produce a difference in the drain-source voltage Vds of the switches 31 to 34 and 41 to 44.

(1-3) The use of the low on-resistance switches 31 to 34 and 41 to 44 lowers the cost and increases efficiency.

Second Preferred Embodiment

A switching circuit according to a second preferred embodiment of the present invention will now be described with reference to FIGS. 8 and 9. The switching circuit 20A in accordance with the present preferred embodiment differs from the switching circuit 20A in accordance with the first preferred embodiment in that a voltage adjustment circuit 80 is included to turn off the first switches 31 to 34 of the first switch group 30 and the second switches 41 to 44 of the second switch group 40. In the description hereafter, the same reference numerals denote those components that are the same as the corresponding components in the first preferred embodiment. Such components will not be described in detail.

Figure 8:
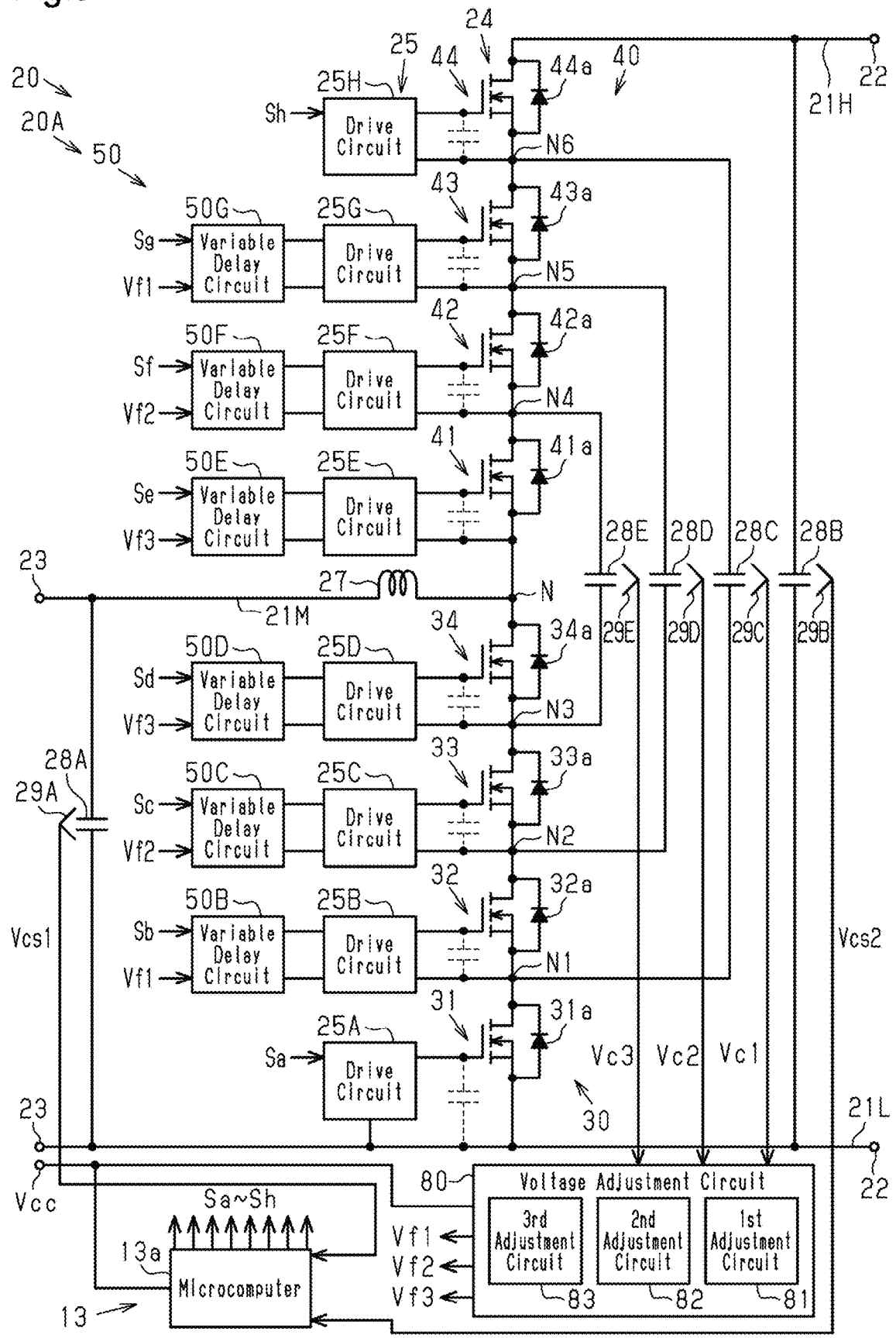
FIG. 8 is a circuit diagram of a switching circuit in accordance with a second preferred embodiment of the present invention.

As shown in FIG. 8, the switching circuit 20A does not include the variable delay circuits 50A and 50H. Thus, in the switching circuit 20A in accordance with the present preferred embodiment, the capacitors 53 are not connected to the ones of the first switches 31 to 34 and the second switches 41 to 44 that are arranged closest to the high-potential side, namely, the second switch 44, and closest to the low-potential side, namely, the first switch 31. The capacitor 53, which is a voltage-control type variable capacitance element, is connected to a stage preceding the gate terminal of each of the first switches 32 to 34 and the second switches 41 to 43. The switching circuit 20A includes 2n switches, which are connected in the first switch group 30 and the second switch group 40, and 2n–2 voltage-control variable capacitance elements, which are respectively connected to a stage preceding the gate terminals of the switches excluding the switch closest to the high potential side and the switch closest to the low potential side. Further, the voltage adjustment circuit 80 may acquire the voltages Vc1 to Vc3 using elements other than the voltage sensors 29C to 29E, and the switching circuit 20A of the present preferred embodiment may not include the voltage sensors 29C to 29E.

The switching circuit 20A of the present preferred embodiment includes a power terminal VCC. The power terminal VCC is connected to a control power supply of which the power voltage is, for example, several volts (e.g., about 2 V to about 5 V). The control power supply is connected to the microcomputer 13a.

The voltage adjustment circuit 80 is a feedback circuit that applies adjustment voltages Vf1 to Vf3 to the capacitors 53 (voltage-control variable capacitance elements) of the variable delay circuits 50B to 50G based on the voltages Vc1 to Vc3 of the capacitors 28C to 28E.

The voltage adjustment circuit 80 includes a first adjustment circuit 81 that applies an adjustment voltage Vf1 to the variable delay circuits 50B and 50G, a second adjustment circuit 82 that applies an adjustment voltage Vf2 to the variable delay circuits 50C and 50F, and a third adjustment circuit 83 that applies an adjustment voltage Vf3 to the variable delay circuits 50D and 50E. The first adjustment circuit 81 is electrically connected to the two ends of the capacitor 28C and to the variable delay circuits 50B and 50G. The second adjustment circuit 82 is electrically connected to the two ends of the capacitor 28D and to the variable delay circuit 50C and 50F. The third adjustment circuit 83 is electrically connected to the two ends of the capacitor 28E and to the variable delay circuits 50D and 50E.

The first adjustment circuit 81 is configured so that when the voltage at the capacitor 28C is a preset first value Vth1 (in one example, first value is voltage at capacitor 28B×¾), the adjustment voltage Vf1 is in the middle or substantially in the middle of a variable capacitance range of the capacitor 53 of each of the variable delay circuits 50B and 50G (refer to FIG. 4). The second adjustment circuit 82 is configured so that when the voltage at the capacitor 28D is a preset second value Vth2 (in one example, second value is voltage at capacitor 28B×½), the adjustment voltage Vf2 is in the middle or substantially in the middle of a variable capacitance range of the capacitor 53 of each of the variable delay circuits 50C and 50F. The third adjustment circuit 83 is configured so that when the voltage at the capacitor 28E is a third value Vth3 (in one example, third value is voltage at capacitor 28B×¼), the adjustment voltage Vf3 is in the middle or substantially in the middle of a variable capacitance range of the capacitor 53 of each of the variable delay circuits 50D and 50E.

Figure 9:
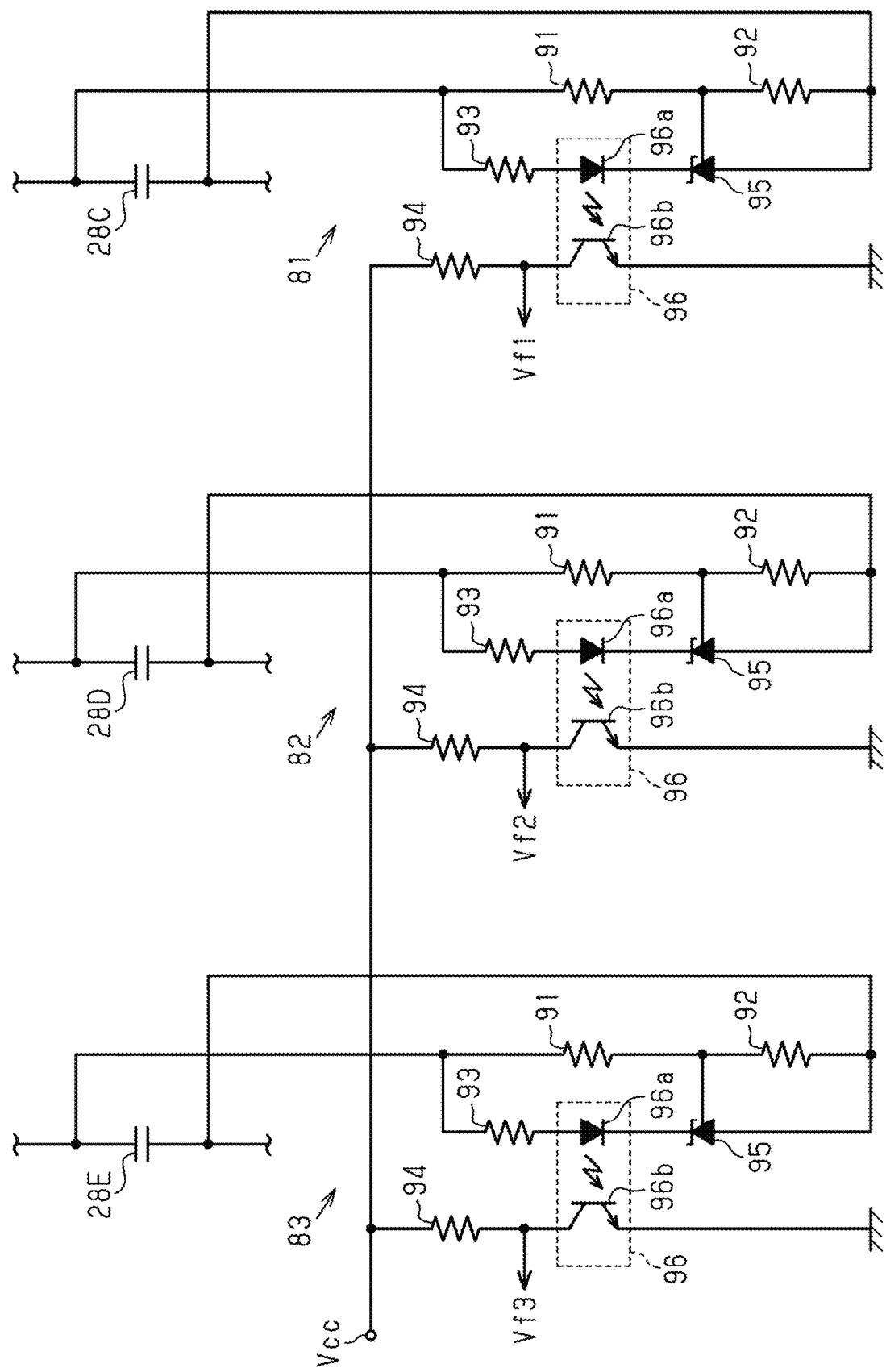
FIG. 9 is a circuit diagram of a voltage adjustment circuit in the second preferred embodiment of the present invention.

As shown in FIG. 9, the first adjustment circuit 81 includes four resistors 91, 92, 93, and 94, a shunt regulator 95, and a photocoupler 96. The resistors 91 and 92 are connected to each other in series and connected parallel to the capacitor 28C. The resistors 91 and 92 define a voltage detector that detects the voltage at the capacitor 28C. The resistor 93, the photocoupler 96, and the shunt regulator 95 are connected in parallel to the resistors 91 and 92.

The photocoupler 96 includes a light-emitting diode 96a and a phototransistor 96b. The anode of the light-emitting diode 96a is connected to the resistor 93. The cathode of the light-emitting diode 96a is connected to the shunt regulator 95. The collector of the phototransistor 96b is connected via the resistor 94 to the power terminal VCC. A node between the collector of the phototransistor 96b and the resistor 94 is electrically connected to the capacitor 53 of each of the variable delay circuits 50B and 50G.

The cathode of the shunt regulator 95 is connected to the cathode of the light-emitting diode 96a. The anode of the shunt regulator 95 is connected to the resistor 92. The shunt regulator 95 includes a reference terminal connected between the resistor 91 and the resistor 92. The voltage at the capacitor 28C is divided by the resistors 91 and 92 and input to the reference terminal of the shunt regulator 95. The input voltage increases or decreases the sink current of the cathode. The shunt regulator 95 increases the sink current of the cathode as the voltage at the reference terminal increases.

The photocoupler 96 increases the current of the light-emitting diode 96a in accordance with an increase or decrease in the sink current of the shunt regulator 95. Thus, the shunt regulator 95 and the light-emitting diode 96a define a feedback circuit configured to cause a light emitting element (e.g., the light-emitting diode 96a) to output in accordance with the voltage at the capacitor 28C. The current of the phototransistor 96b increases or decreases in accordance with the increase or decrease in the current of the light-emitting diode 96a. The increase or decrease in the current of the phototransistor 96b varies the adjustment voltage Vf1 applied to the variable delay circuits 50B and 50G. In this manner, the phototransistor 96b and the resistor define a voltage generator that generates the adjustment voltage Vf1 applied to the capacitor 53 of each of the variable delay circuits 50B and 50G in accordance with the output of a light conversion element.

The second adjustment circuit 82 and the third adjustment circuit 83 have the same or substantially the same configuration as the first adjustment circuit 81. Thus, the same reference numerals denote those components of the second adjustment circuit 82 and the third adjustment circuit 83 that are the same as the corresponding components in the first adjustment circuit 81. Such components will not be described in detail. Hereafter, the second adjustment circuit 82 and the third adjustment circuit 83 will be described focusing on the differences from the first adjustment circuit 81.

The resistors 91 and 92 of the second adjustment circuit 82 are connected in parallel to the capacitor 28D. The resistors 91 and 92 of the second adjustment circuit 82 define a voltage detector that detects the voltage at the capacitor 28D. The shunt regulator 95 of the second adjustment circuit 82 adjusts the current flowing to the photocoupler 96 of the second adjustment circuit 82 in accordance with the voltage at the capacitor 28D. The shunt regulator 95 and the light-emitting diode 96a of the second adjustment circuit 82 define a feedback circuit configured to cause a light conversion element (e.g., the photocoupler 96) to output in accordance with the voltage at the capacitor 28D. A node between the collector of the phototransistor 96b of the second adjustment circuit 82 and the resistor 94 of the second adjustment circuit 82 is electrically connected to the capacitor 53 of each of the variable delay circuits 50C and 50F. The phototransistor 96b and the resistor 94 of the second adjustment circuit 82 define a voltage generator that generates the adjustment voltage Vf2 applied to the capacitor 53 of each of the variable delay circuits 50C and 50F in accordance with the output of the light conversion element.

The resistors 91 and 92 of the third adjustment circuit 83 are connected in parallel to the capacitor 28E. The resistors 91 and 92 of the third adjustment circuit 83 define a voltage detector that detects the voltage at the capacitor 28E. The shunt regulator 95 of the third adjustment circuit 83 adjusts the current flowing through the photocoupler 96 of the third adjustment circuit 83 in accordance with the voltage at the capacitor 28E. The shunt regulator 95 and the light-emitting diode 96a of the third adjustment circuit 83 define a feedback circuit configured to cause a light conversion element (e.g., the photocoupler 96) to output in accordance with the voltage at the capacitor 28E. A node between the collector of the phototransistor 96b of the third adjustment circuit 83 and the resistor 94 of the third adjustment circuit 83 is electrically connected to the capacitor 53 of each of the variable delay circuits 50D and 50E. The phototransistor 96b and the resistor 94 of the third adjustment circuit 83 define a voltage generator that generates the adjustment voltage Vf3 applied to the capacitor 53 of each of the variable delay circuits 50D and 50E in accordance with the output of the light conversion element.

Although not illustrated in FIG. 8, the control signals Sa and Sb are delayed by delay circuits at, for example, an input side of the drive circuits 25A and 25H. The delay time of the delay circuits is set to be equal or substantially equal to the delay time corresponding to the middle or substantially the middle of a variable capacitance range of the capacitor 53 in each of the variable delay circuits 50B to 50G. The control signals Sa and Sh may be delayed by the microcomputer 13a.

One example of the adjustment of when the switches are turned off in the switching circuit 20A will now be described.

The voltage adjustment circuit 80 of the present preferred embodiments adjusts the time at which the switches 31 to 34 are turned off so that the drain-source voltage Vds of each of the switches 31 to 34 is equal to about one quarter (¼) of the voltage between the first wire 21L and node N when the switches 31 to 34 are turned on and the switches 41 to 44 are turned off in the step-up mode. Further, the voltage adjustment circuit 80 adjusts the time at which the switches 41 to 44 are turned off so that the drain-source voltage Vds of each of the switches 41 to 44 is equal to about one quarter (¼) of the voltage between the second wire 21H and node N when the switches 31 to 34 are turned off and the switches 41 to 44 are turned on in the step-down mode.

More specifically, in the first adjustment circuit 81, when the voltage Vc1 at the capacitor 28C becomes greater than the first value Vth1, the current flowing through the light-emitting diode 96a of the photocoupler 96 increases. This lowers the impedance of the phototransistor 96b of the photocoupler 96. Thus, the potential at the node between the collector of the phototransistor 96b and the resistor 94 of the first adjustment circuit 81 decreases. This decreases the adjustment voltage Vf1. Referring to FIG. 4, as the voltage applied to the capacitor 53 decreases, the capacitance of the capacitor 53 increases. This decreases the adjustment voltage Vf1 and increases the capacitance of the capacitor 53 in each of the variable delay circuits 50B and 50G. As a result, when the switches 31 to 34 are turned on and the switches 41 to 44 are turned off in the step-up mode, the variable delay circuit 50B delays the time at which the first switch 32 is turned off. When the switches 31 to 34 are turned off and the switches 41 to 44 are turned on in the step-down mode, the variable delay circuit 50G delays the time at which the second switch 43 is turned off.

When the voltage Vc1 at the capacitor 28C becomes less than the first value Vth1, the current flowing through the light-emitting diode 96a decreases. This lowers the impedance of the phototransistor 96b. Thus, the potential at the node between the collector of the phototransistor 96b and the resistor 94 of the first adjustment circuit 81 increases. This increases the adjustment voltage Vf1. The increase in the adjustment voltage Vf1 decreases the capacitance of the capacitor 53. As a result, when the switches 31 to 34 are turned on and the switches 41 to 44 are turned off in the step-up mode, the variable delay circuit 50B advances the time at which the first switch 32 is turned off. When the switches 31 to 34 are turned off and the switches 41 to 44 are turned on in the step-down mode, the variable delay circuit 50G advances the time at which the second switch 43 is turned off.

In the same or substantially the same manner as the first adjustment circuit 81, in the second adjustment circuit 82, when the voltage Vc2 at the capacitor 28D becomes greater than the second value Vth2, the adjustment voltage Vf2 decreases. This increases the capacitance of the capacitor 53 in each of the variable delay circuits 50C and 50F. As a result, when the switches 31 to 34 are turned on and the switches 41 to 44 are turned off in the step-up mode, the variable delay circuit 50C delays the time at which the first switch 33 is turned off. When the switches 31 to 34 are turned off and the switches 41 to 44 are turned on in the step-down mode, the variable delay circuit 50F delays the time at which the second switch 42 is turned off.

When the voltage Vc2 at the capacitor 28D becomes less than the second value Vth2, the adjustment voltage Vf2 increases. This decreases the capacitance of the capacitor 53 in each of the variable delay circuits 50C and 50F in the same or substantially the same manner as the first adjustment circuit 81. As a result, when the switches 31 to 34 are turned on and the switches 41 to 44 are turned off in the step-up mode, the variable delay circuit 50C advances the time at which the first switch 33 is turned off. When the switches 31 to 34 are turned off and the switches 41 to 44 are turned on in the step-down mode, the variable delay circuit 50F advances the time at which the second switch 42 is turned off.

In the same or substantially the same manner as the first adjustment circuit 81, in the third adjustment circuit 83, when the voltage Vc3 at the capacitor 28E becomes greater than the third value Vth3, the adjustment voltage Vf3 decreases. This increases the capacitance of the capacitor 53 in each of the variable delay circuits 50D and 50E. As a result, when the switches 31 to 34 are turned on and the switches 41 to 44 are turned off in the step-up mode, the variable delay circuit 50D delays the time at which the first switch 34 is turned off. When the switches 31 to 34 are turned off and the switches 41 to 44 are turned on in the step-down mode, the variable delay circuit 50E delays the time at which the second switch 41 is turned off.

When the voltage Vc3 at the capacitor 28E becomes less than the third value Vth3, the adjustment voltage Vf3 increases. This decreases the capacitance of the capacitor 53 in each of the variable delay circuits 50D and 50E in the same or substantially the same manner as the first adjustment circuit 81. As a result, when the switches 31 to 34 are turned on and the switches 41 to 44 are turned off in the step-up mode, the variable delay circuit 50D advances the time at which the first switch 34 is turned off. When the switches 31 to 34 are turned off and the switches 41 to 44 are turned on in the step-down mode, the variable delay circuit 50E advances the time at which the second switch 41 is turned off.

The feedback operation described above results in the voltage adjustment circuit 80 generating the adjustment voltages Vf1 to Vf3 so that the first switches 32 to 34 are synchronized with the first switch 31 in the step-up mode. Further, the feedback operation described above results in the voltage adjustment circuit 80 generating the adjustment voltages Vf1 to Vf3 so that the second switches 41 to 43 are synchronized with the second switch 44 in the step-down mode.

The advantages of the present preferred embodiment will now be described. In addition to advantages (1-2) and (1-3) of the first preferred embodiment, the present preferred embodiment has the advantages described below.

(2-1) The voltage adjustment circuit 80 adjusts the time at which the switches 32 to 34 and 41 to 43 are turned off based on the voltages at the snubber capacitors 28C to 28E. The difference in parasitic capacitance varies the time at which each switch is turned off. Thus, the output capacitance of each of the switches 31 to 34 and 41 to 44 is extracted as the voltage at the corresponding one of the capacitors 28C to 28E, and the voltage adjustment circuit 80 adjusts the time at which the switches 32 to 34 and 41 to 43 are turned off. In this manner, the voltage adjustment circuit 80 reduces the difference in the drain-source voltage Vds between the switches 31 to 34 and 41 to 44.

Third Preferred Embodiment

When the capacitance of the capacitor 53, which defines and functions as a voltage-control variable capacitance element, is adjusted to adjust the turn-off time as in the above-described preferred embodiment, the drain-source voltage Vds may surge in the first switches 31 to 34 and the second switches 41 to 44. This will now be described with reference to FIG. 10.

Figure 10:
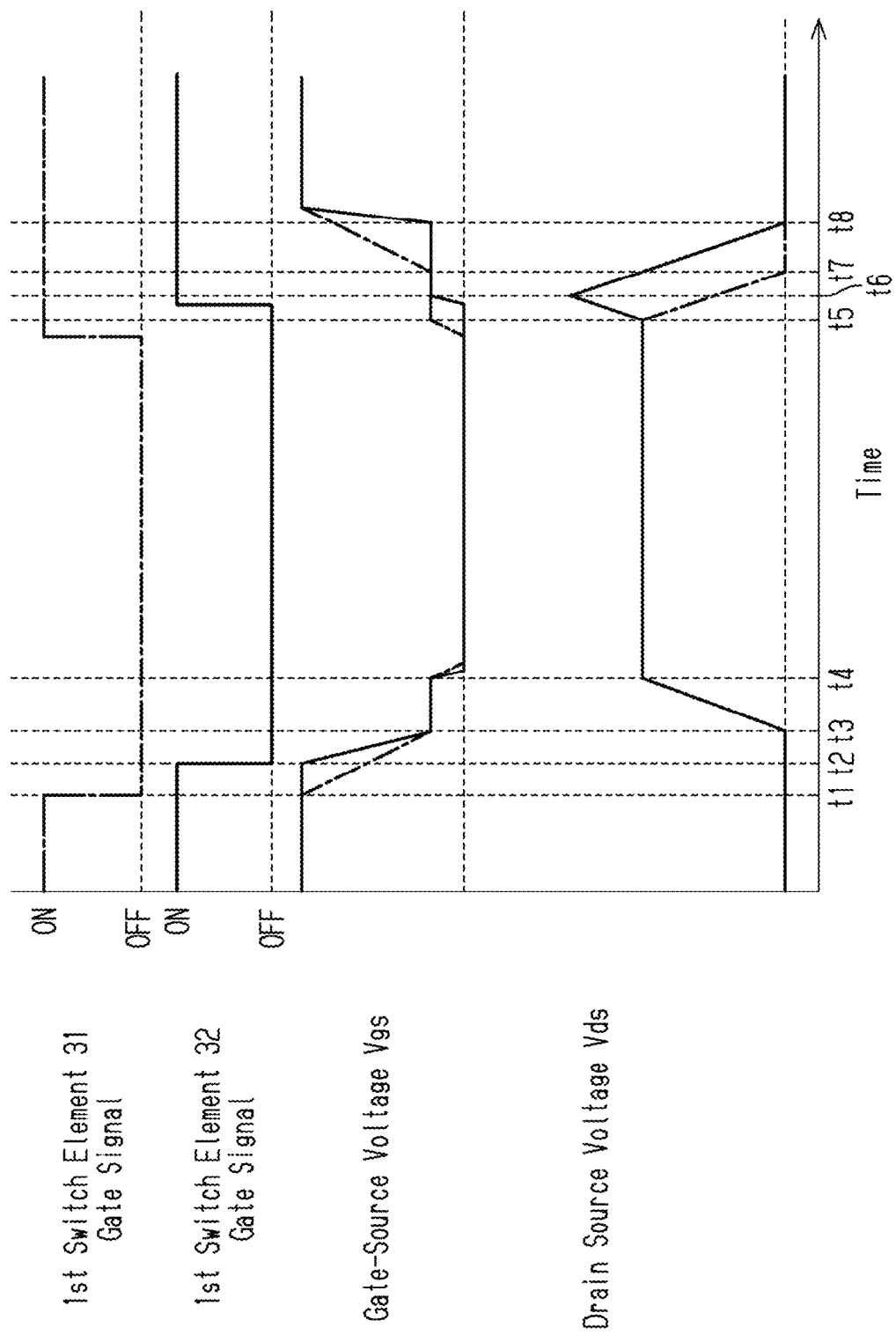
FIG. 10 is a time chart illustrating a problem to be solved in a third preferred embodiment of the present invention.

In the example shown in FIG. 10, time t2 at which the gate signal of the first switch 32 is turned off is delayed from time t1 at which the gate signal of the first switch 31 is turned off. In this example, the gate-source voltage Vgs of the first switch 31 and the first switch 32 are both mirror voltages during the period from t3 to t4.

When the electrostatic capacitance of the capacitor 53 in the variable delay circuit 50B is adjusted to delay the time at which a gate signal is turned off, in addition to delaying the time at which the gate signal is turned off from the time at which a control signal Sb is turned off, the time at which the gate signal is turned on is also delayed from the time at which the control signal Sb is turned on. Thus, as shown in FIG. 10, the time at which the gate signal of the first switch 32 is turned on is delayed from the time at which the gate signal of the first switch 31 is turned on. Thus, time t6 at which the gate-source voltage Vgs of the first switch 32 becomes a mirror voltage is delayed from time t5 at which the gate-source voltage Vgs of the first switch 31 becomes a mirror voltage. At time t5, when the gate-source voltage Vgs of the first switch 31 becomes a mirror voltage, the discharge of parasitic capacitor between the drain and source of the first switch 31 starts. This decreases the drain-source voltage Vds of the first switch 31. When the discharge of the parasitic capacitor between the drain and source of the first switch 31 starts, the drain-source voltage Vds of the first switch 32 relatively increases. At time t6, when the gate-source voltage Vgs of the first switch 32 reaches the mirror voltage, the discharge of the parasitic capacitor between the drain and source of the first switch 32 starts. This decreases the drain-source voltage Vds of the first switch 32. The mirror period of the first switch 31 ends at time t7. The mirror period of the first switch 32 ends at time t8.

Figure 11:
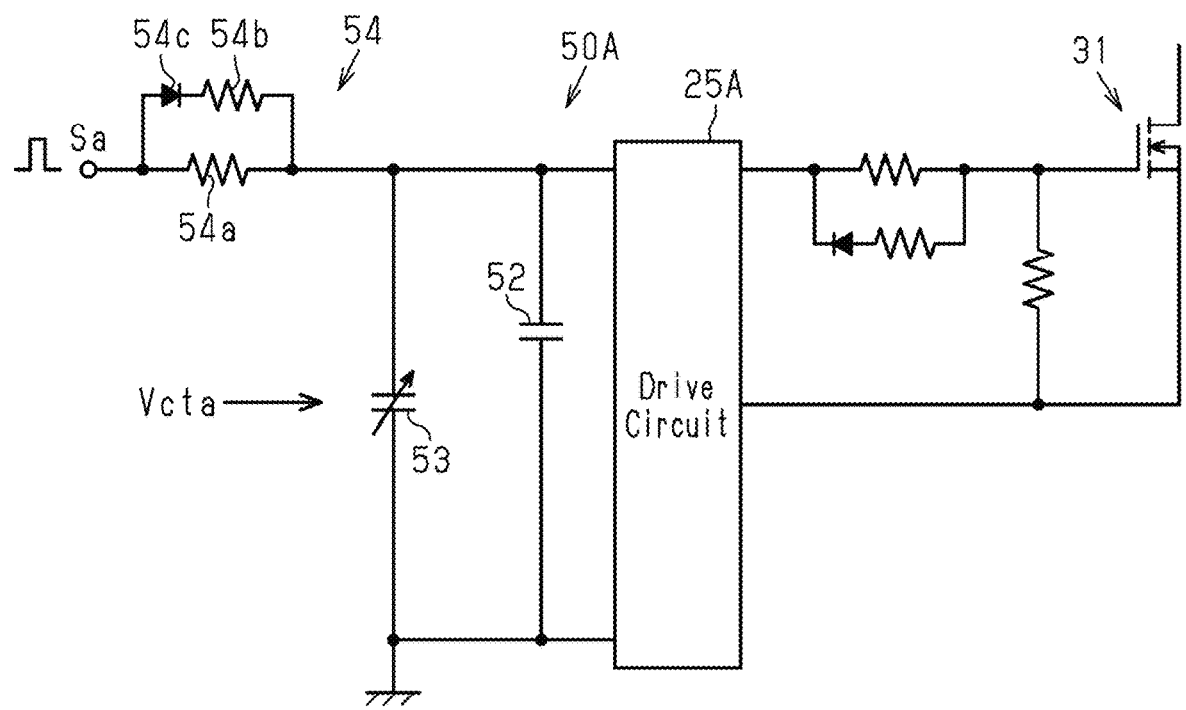
FIG. 11 is a circuit diagram of a variable delay circuit in the third preferred embodiment of the present invention.

In the present preferred embodiment, the variable delay circuits 50A to 50H are provided as shown in FIG. 11 to limit surges.

FIG. 11 shows the configuration of the variable delay circuit 50A in accordance with the present preferred embodiment. The variable delay circuits 50B to 50H each have the same or substantially the same configuration as the variable delay circuit 50A. As shown in FIG. 11, in the present preferred embodiment, the control signal Sa is applied to one terminal of a parallel-connected body (hereafter, referred to as the resistor 54) that includes a resistor 54a and a series-connected body of a resistor 54b and a diode 54c. The other terminal of the resistor 54 is connected to the capacitors 52 and 53. The resistor 54 and the capacitors 52 and 53 define an RC series-connected circuit, and the voltage at a connection point between the resistor 54 and the capacitors 52 and 53 is applied to the drive circuit 25.

The cathode side of the diode 54c is the side closer to the capacitors 52 and 53. Thus, when the control signal Sa rises to turn on the first switch 31, current flows through both of the resistor 54a, 54b to the capacitors 52 and 53. When the control signal Sa falls to turn off the first switch 32, current flows from the capacitors 52 and 53 to the resistor 54a but not to the resistor 54b.

Accordingly, when the resistor 54a has resistance Ra and the resistor 54b has resistance Rb, the resistance of the resistor 54 is Rb when turned off and Rc={Ra·Rb/(Ra+Rb)} when turned on. In the present preferred embodiment, such a circuit connected to a diode is defined as an impedance conversion circuit of which the impedance when current flows in a forward direction differs from the impedance when current flows in a direction opposite to the forward direction. A switch may be used instead of the diode and controlled to go ON when turned on and go OFF when turned off.

When using the combined electrostatic capacitance C of the capacitors 52 and 53, the time-constant of the RC series-connected circuit is 1/(Rc·C) when turned on and 1/(Rb·C) when turned off. In the present preferred embodiment, the capacitor 53 and the resistor 54 define a time-constant circuit. Even when the capacitance of the capacitor 53 does not vary from turn-on to turn-off, the resistance of the resistor 54 is varied. This varies the impedance of the time-constant circuit. Further, the difference in impedance between turn-on and turn-off produces a difference in the time-constant of the time-constant circuit.

The resistance Rc is smaller than the resistance Rb. Thus, the electrostatic capacitance C is decreased so that the delay of the time at which the gate signal is turned on from the time at which the control signal Sa is turned on is shorter than the delay of the time at which the gate signal is turned off from when the control signal Sa is turned off. In other words, the resistor 54 limits the effect that the turn-off time delaying process for adjusting the electrostatic capacitance C has on the turn-off time. A capacitor may be used instead of the resistor 54b so that the turn-on delay is shorter than the turn-off delay.

Figure 12:
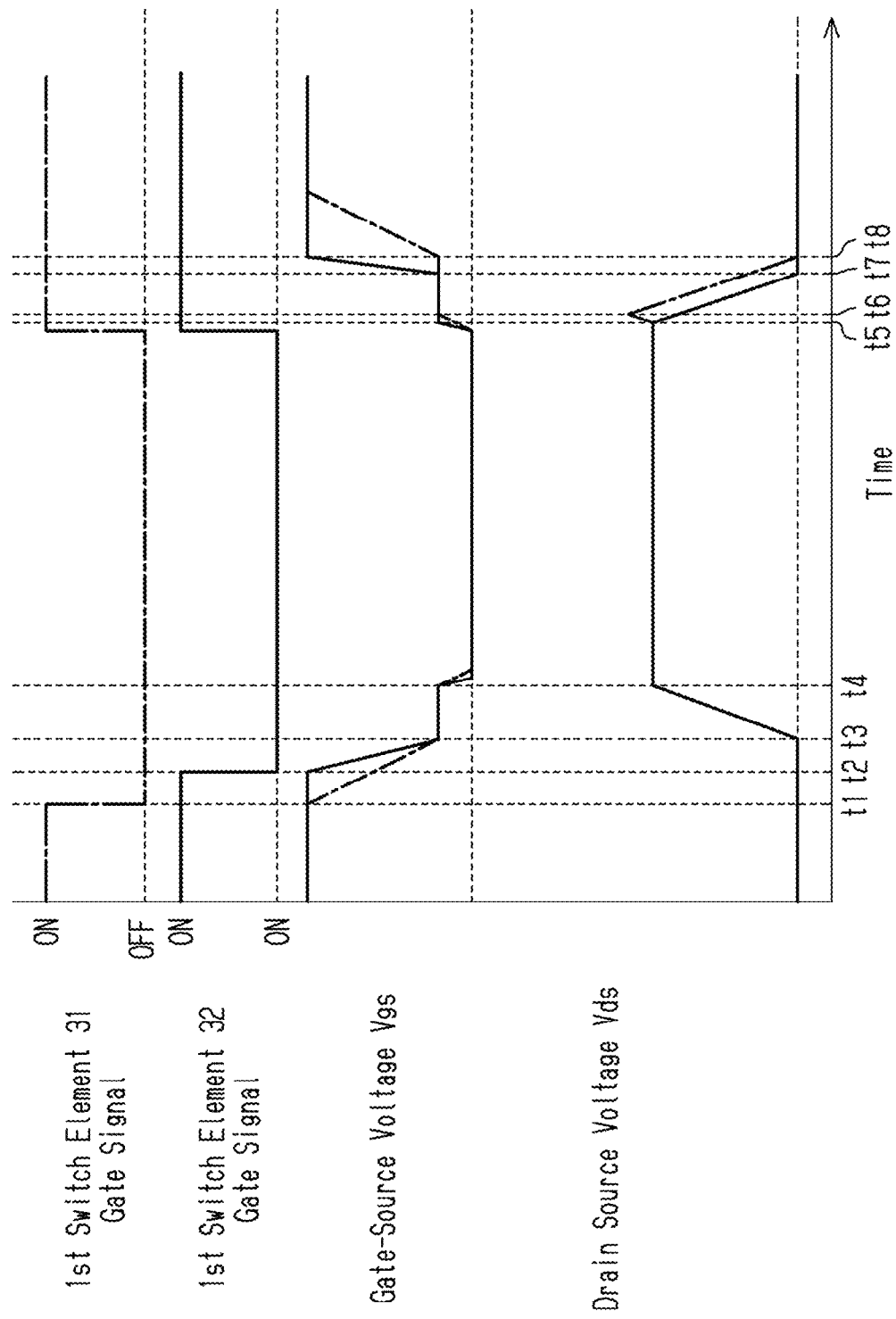
FIG. 12 is a time chart illustrating an example for turning off and turning on a switch in the third preferred embodiment of the present invention.

In the example shown in FIG. 12, time t2 at which the gate signal of the first switch 32 is turned off is delayed from time t1 at which the gate signal of the first switch 31 is turned off in the present preferred embodiment. Time t1 to time t4 is the same in FIGS. 10 and 12.

As shown in FIG. 12, in the present preferred embodiment, the time at which the gate signal of the first switch 31 is turned on is equal or substantially equal to the time at which the gate signal of the first switch 32 is turned on. This limits surges in the drain-source voltage Vds of the first switch 32. In the example illustrated in FIG. 12, the drain-source voltage Vds of the first switch 31 surges slightly. This is because the gate-source voltage Vgs changes at a higher speed in the first switch 32. Thus, when the time at which the gate signal changes is the same or substantially the same in the first switches 31 and 32, the gate-source voltage Vgs of the first switch 32 reaches the mirror voltage before the gate-source voltage Vgs of the first switch 31. In the present preferred embodiment, however, the delay of time t6 at which the gate-source voltage Vgs of the first switch 31 reaches the mirror voltage from time t5 at which the gate-source voltage Vgs of the first switch 32 reaches the mirror voltage is shorter than the delay illustrated in FIG. 10. Thus, the delay is shortened as compared with the delay of time t6 at which the gate-source voltage Vgs of the first switch 32 reaches the mirror voltage from time t5 at which the gate-source voltage Vgs of the first switch 31 reaches the mirror voltage. This sufficiently limits surges in the drain-source voltage Vds.

Other Preferred Embodiments

The above preferred embodiments may be modified as described below. The above-described preferred embodiments and the modified examples described below may be combined as long as there is no technical contradiction.

In each of the above preferred embodiments, the first switch group 30 and the second switch group 40 each include four switches but may, instead, include two, three, five, or more switches.

In each of the above preferred embodiments, the capacitor 53, which defines and functions as a voltage-control type variable capacitance element, is used to delay the time for turning off and turning on the gate signal of each of the switches 31 to 34 and 41 to 44. However, there is no limit to such a configuration. Other elements may be used to delay the time for turning on and turning off the gate signal of each of the switches 31 to 34 and 41 to 44.

A thyristor, for example, may be used as a rectifying element, instead of the diode 54c shown in FIG. 11, and the control signal Sa may be applied to the gate of the thyristor. For example, the diode 54c may be omitted, and an n-type MOSFET may be connected between the resistor 54b and the capacitors 52 and 53. The gate of the n-type MOSFET may be connected to the side of the resistor 54a to which the control signal Sa is input. A rectifying element does not necessarily have to be connected to a resistor. For example, a diode, of which the anode side is closer to the capacitors 52 and 53, may be connected to the resistor 54a. In this case, the resistance Rb of the resistor 54b is greater than the resistance Ra of the resistor 54a. Thus, the advantages of the third preferred embodiment are obtained. Further, the resistor 54 does not have to be defined by connecting two resistors in parallel. For example, three or more resistors may be connected in parallel, and a rectifying element may be connected in series to at least one of the resistors.

The example of the circuit configuration shown in FIG. 11 may be applied to the first preferred embodiment, the second preferred embodiment, and modifications of the first and second preferred embodiments.

Figure 13:
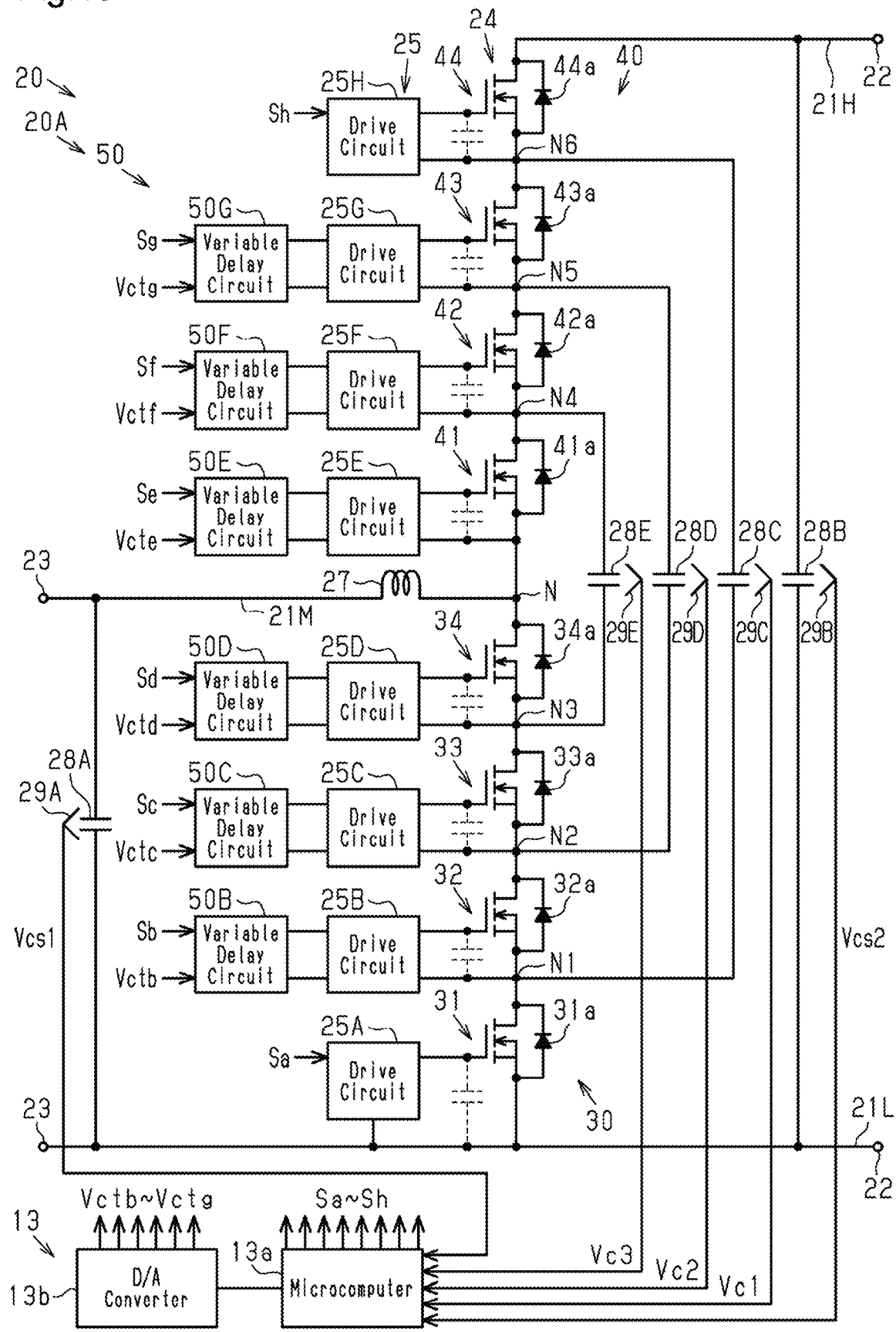
FIG. 13 is a circuit diagram of a switching circuit in accordance with a modified example of a preferred embodiment of the present invention.

In the first preferred embodiment, the variable delay circuits 50A and 50H may be omitted as shown in FIG. 13. In the switching circuit 20A shown in FIG. 13, the capacitor 53 is not connected to the ones of the first switches 31 to 34 and the second switches 41 to 44 arranged closest to the high-potential side, namely, the second switch 44, and closest to the low-potential side, namely, the first switch 31.

The capacitor 53, which is a voltage-control variable capacitance element, is connected to a stage preceding the gate terminal of each of the first switches 32 to 34 and the second switches 41 to 43. In the switching circuit 20A, n switches are connected in each of the first switch group 30 and the second switch group 40. Thus, the number of switches included in the switching circuit 20A is 2n. Further, a voltage-control variable capacitance element is connected to a stage preceding the gate terminal of each of the switches excluding the switch closest to the high potential side and the switch closest to the low potential side. Thus, the number of voltage-control variable capacitance elements connected to the first switch group 30 and the second switch group 40 is 2n−2. In this case, the microcomputer 13a outputs adjustment signals to the D/A converter 13b for the variable delay circuits 50B to 50G. The D/A converter 13b outputs adjustment voltages Vctb to Vctg, which correspond to the adjustment signals, as instruction value signals to the variable delay circuits 50B to 50G. In other words, the microcomputer 13a outputs control signals simultaneously to the gate terminals of 2n−2 switches connected to the voltage-control variable capacitance elements. The microcomputer 13a also outputs instruction value signals of the adjustment voltages applied to the 2n−2 voltage-control variable capacitance elements. With the switching circuit 20A of FIG. 13, steps S100 to S104 are omitted from the delay adjustment control in the step-up mode of FIG. 5. Thus, the controller 13 starts the delay adjustment control from step S110. Further, steps S200 to S204 are omitted from the delay adjustment control in the step-down mode of FIG. 6. Thus, the controller 13 starts the delay adjustment control from step S210.

In the second preferred embodiment, the capacitor 52 may be omitted from at least one of the variable delay circuits 50B to 50G.

In the second preferred embodiment, at least one of the variable delay circuit 50A, which is connected to a stage preceding the gate terminal of the first switch 31, and the variable delay circuit 50H, which is connected to a stage preceding the gate terminal of the second switch 44, may be added.

In the second preferred embodiment, the configuration of the voltage adjustment circuit 80 may be changed. In one example, instead of the photocoupler 96, the voltage adjustment circuit 80 may include a different type of photoconversion element, a magnetic conversion element, or the like.

In each of the above preferred embodiments, the switching circuit 20A is used in a bidirectional power conversion device. Instead, the switching circuit 20A may be used in a unidirectional power conversion device.

Figure 14:
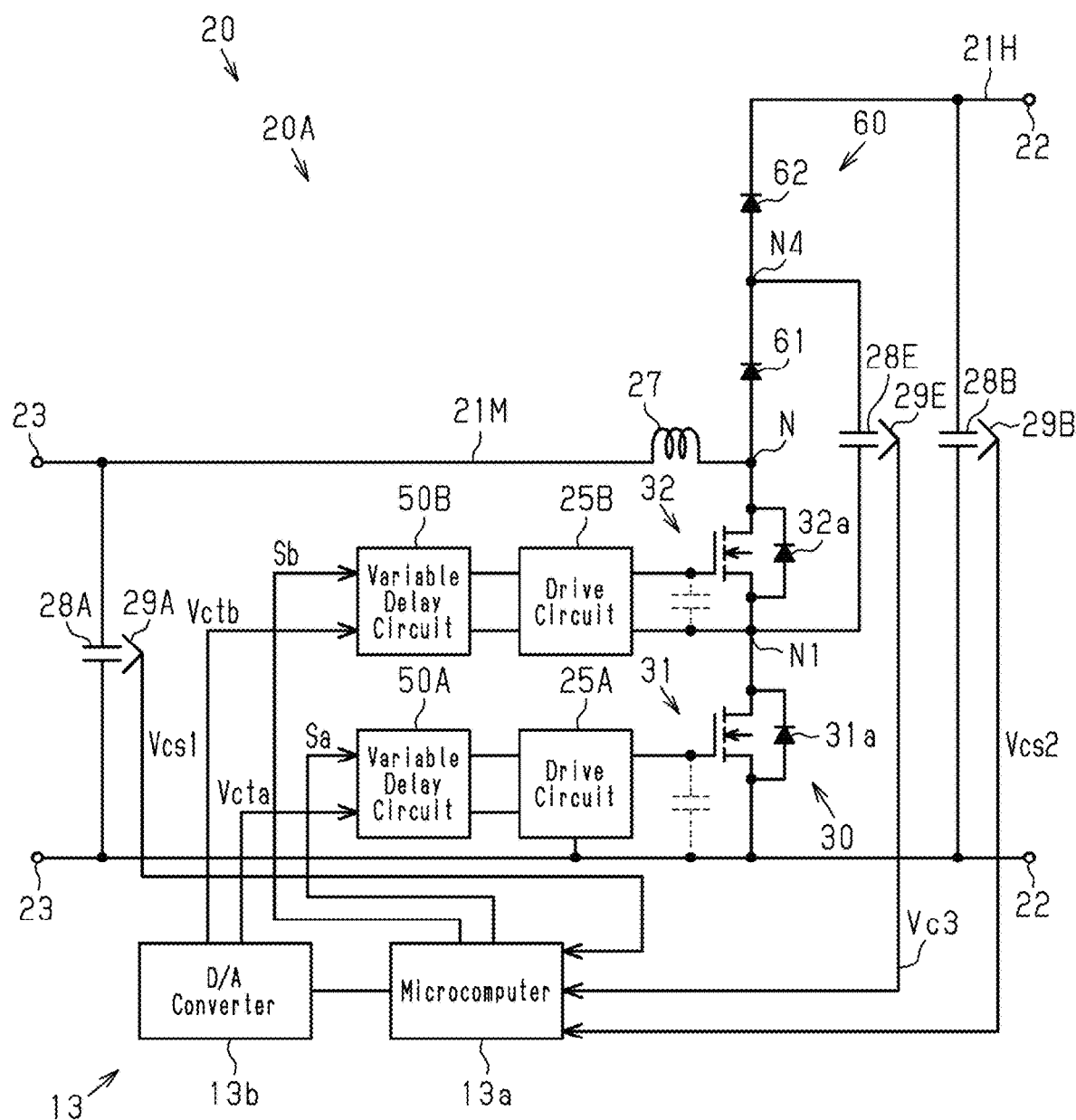
FIG. 14 is a circuit diagram of a switching circuit in accordance with a modified example of a preferred embodiment of the present invention.

As shown in FIG. 14, for example, the switching circuit 20A may be used in a step-up DC-DC converter (power conversion device). In this example, instead of the second switch group 40, the switching circuit 20A includes a diode group 60 including two diodes 61 and 62 connected in series. In the switching circuit 20A, the first switch group 30 includes the first switches 31 and 32, the number of which is the same as the diodes 61 and 62. In such a configuration, the voltages at the capacitors 28A, 28B, and 28E are detected, and the time at which the gate terminals of the switches 31 and 32 are turned off is adjusted based on the detected voltages to obtain advantage (1-1) of the above preferred embodiment.

Figure 15:
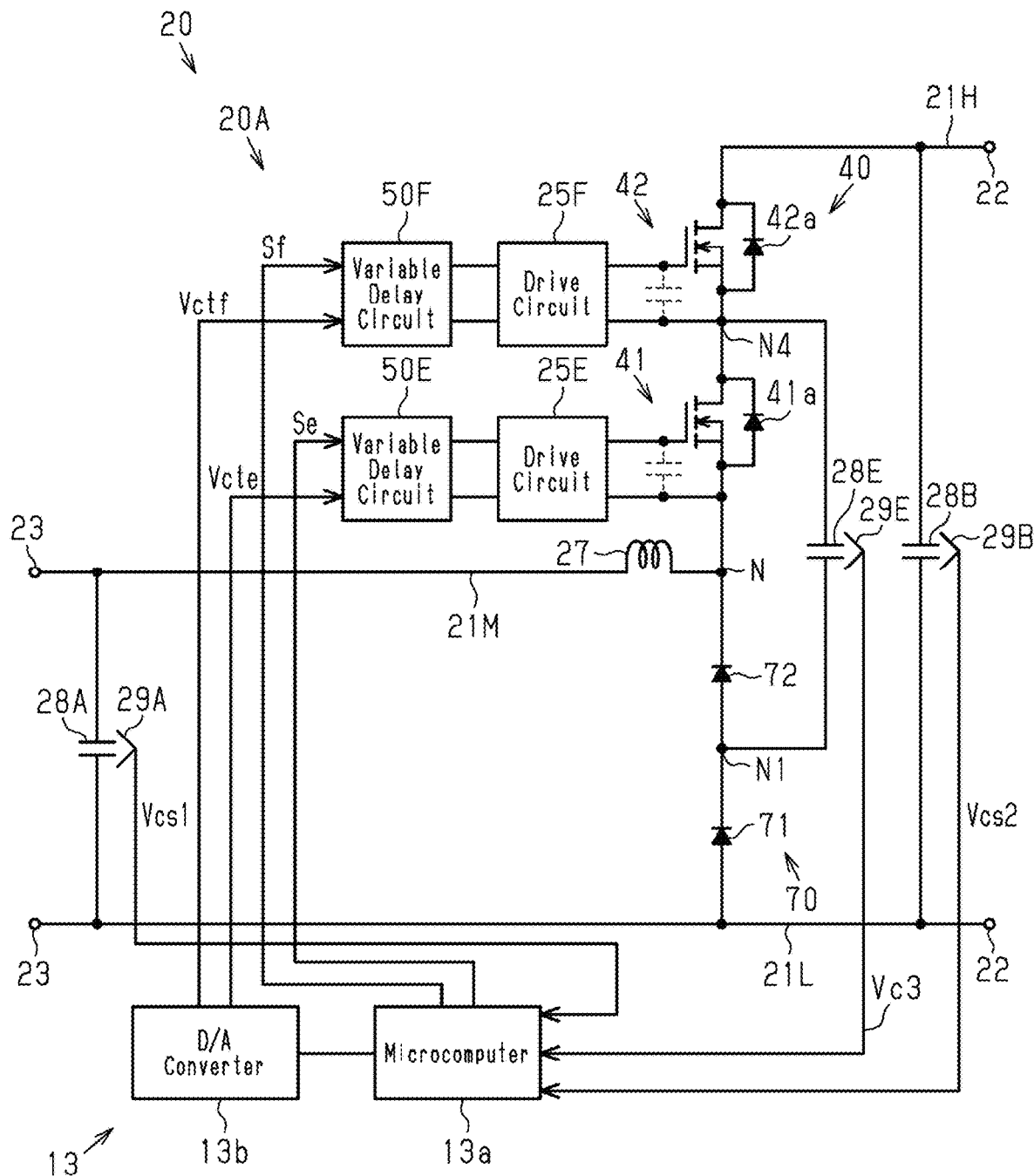
FIG. 15 is a circuit diagram of a switching circuit in accordance with a modified example of a preferred embodiment of the present invention.

As shown in FIG. 15, the switching circuit 20A may be used in a step-down converter (power conversion device). In this example, instead of the first switch group 30, the switching circuit 20A includes a diode group 70 including two diodes 71 and 72 connected in series. In the switching circuit 20A, the second switch group 40 includes the second switches 41 and 42, the number of which is the same as the diodes 71 and 72. In such a configuration, the voltages at the capacitors 28A, 28B, and 28E are detected, and the time at which the gate terminals of the switches 41 and 42 are turned off is adjusted based on the detected voltages to obtain advantage (1-1) of the above preferred embodiment.

The switching circuit 20A in each of the above preferred embodiments is used in the power converter 20 of the power management system 1 that is of a single-phase two-wire type. Instead, the switching circuit 20A may be used in the power converter 20 of the power management system 1 that is of a single-phase three-wire type, for example.

Preferred Embodiments

Technical concepts that can be understood from each of the above preferred embodiments and modified examples will now be described.

A switching converter according to the first preferred embodiment includes first input/output portions to which a first voltage is applied and second input/output portions to which a second voltage, which is lower than the first voltage, is applied; a switch circuit including first and second switch groups, each including n, where n is an integer that is greater than or equal to 2, switches connected in series, that are connected in series between the first input/output portions in order of the first switch group and the second switch group from one of the first input/output portions that is at a lower potential side; an inductor connected to one of the second input/output portions that is at a higher potential side and connected in series with the first switch group and the second switch group between the second input/output portions; a first capacitor connected between the second input/output portions and connected in parallel to the first switch group; a second capacitor connected between the first input/output portions and connected in parallel to the switch circuit; a snubber circuit including snubber capacitors respectively connecting mth ones, where 1≤m≤n−1, of connection points between the switches of the first switch group and connection points between the switches of the second switch group from a connection point between the first switch group and the second switch group; and a controller configured or programmed to turn off a gate terminal of each of the switches in the first and second switch groups, wherein the controller detects voltages at the snubber capacitors and a voltage at the second capacitor and adjusts a time at which a gate terminal of each of the switches is turned off based on the voltages at the snubber capacitor and the voltage at the second capacitor.

With this structure, the controller detects the voltages at the snubber capacitors and the voltage at the second capacitor and delays the time at which the gate terminal of each switch is turned off based on the voltages at the snubber capacitor and the voltage at the second capacitor to reduce differences in the drain-source voltage Vds of the switches.

A switching converter according to the second preferred embodiment includes first input/output portions to which a first voltage is applied and second input/output portions to which a second voltage, which is lower than the first voltage, is applied; a switch circuit including a switch group, including n, where n is an integer that is greater than or equal to 2, switches connected in series, and a diode group, including n, where n is an integer that is greater than or equal to 2, diode elements connected in series, that are connected in series between the first input/output portions; a first capacitor connected between the second input/output portions and connected in parallel to the switch group or the diode group; a second capacitor connected between the first input/output portions and connected in parallel to the switch circuit; a snubber circuit including snubber capacitors respectively connecting mth ones, where 1≤m≤n−1, of connection points between the switches of the switch group and connection points between the diode elements of the diode switch group from a connection point between the switch group and the diode group; and a controller configured or programmed to turn off a gate terminal of each of the switches in the switch group, wherein the controller detects voltages at the snubber capacitors and a voltage at the second capacitor and adjusts a time at which a gate terminal of each of the switches is turned off based on the voltages at the snubber capacitor and the voltage at the second capacitor.

With this structure, the controller detects the voltages at the snubber capacitors and the voltage at the second capacitor and delays the time at which the gate terminal of each switch is turned off based on the voltages at the snubber capacitor and the voltage at the second capacitor to reduce differences in the drain-source voltage Vds of the switches.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching converter, comprising:
first input/output portions to which a first voltage is applied and second input/output portions to which a second voltage, which is lower than the first voltage, is applied;
a switch circuit including first and second switch groups, each including n, where n is an integer that is greater than or equal to 2, switches connected in series, that are connected in series between the first input/output portions in order of the first switch group and the second switch group from one of the first input/output portions that is at a lower potential side;
an inductor connected to one of the second input/output portions that is at a higher potential side and connected in series to the first switch group between the second input/output portions;
a first capacitor connected between the second input/output portions and connected in parallel to the first switch group;
a second capacitor connected between the first input/output portions and connected in parallel to the switch circuit;
a snubber circuit including snubber capacitors respectively connecting mth ones, where 1≤m≤n−1, of connection points between the switches of the first switch group and connection points between the switches of the second switch group from a connection point between the first switch group and the second switch group; and
a controller configured or programmed to turn off a gate terminal of each of the switches in the first and second switch groups; wherein
the controller is configured or programmed to detect voltages at the snubber capacitors, a voltage at the first capacitor, and a voltage at the second capacitor and adjusts a time at which a gate terminal of each of the switches is turned off based on the voltages at the snubber capacitor, the voltage at the first capacitor, and the voltage at the second capacitor.

2. The switching converter according to claim 1, further comprising:
n voltage-control variable capacitors respectively connected to a stage preceding the gate terminals of the n switches; wherein
the controller is configured or programmed to output a control signal to the gate terminal of each of the n switches and outputs instruction value signals of adjustment voltages applied to the n voltage-control variable capacitors.

3. A switching converter, comprising:
first input/output portions to which a first voltage is applied and second input/output portions to which a second voltage, which is lower than the first voltage, is applied;
a switch circuit including a switch group, including n, where n is an integer that is greater than or equal to 2, switches connected in series, and a diode group, including n, where n is an integer that is greater than or equal to 2, diodes connected in series, that are connected in series between the first input/output portions;
a first capacitor connected between the second input/output portions and connected in parallel to the switch group or the diode group;
a second capacitor connected between the first input/output portions and connected in parallel to the switch circuit;
a snubber circuit including snubber capacitors respectively connecting mth ones, where 1≤m≤n−1, of connection points between the switches of the switch group and connection points between the diodes of the diode group from a connection point between the switch group and the diode group; and
a controller configured or programmed to turn off a gate terminal of each of the switches in the switch group; wherein
the controller is configured or programmed to detect voltages at the snubber capacitors, a voltage at the first capacitor, and a voltage at the second capacitor and adjusts a time at which a gate terminal of each of the switches is turned off based on the voltages at the snubber capacitor, the voltage at the first capacitor, and the voltage at the second capacitor.

4. The switching converter according to claim 3, further comprising:
n voltage-control variable capacitors respectively connected to a stage preceding the gate terminals of the n switches; wherein
the controller is configured or programmed to output a control signal to the gate terminal of each of the n switches and outputs instruction value signals of adjustment voltages applied to the n voltage-control variable capacitors.

5. The switching converter according to claim 3, further comprising:
a terminal to which a control signal of the controller is input;
an impedance conversion circuit connected between the terminal and a corresponding one of the voltage-control variable capacitors, wherein; and
a time-constant circuit defined by the impedance of the impedance conversion circuit and a capacitance of the voltage-control variable capacitor; wherein
the impedance conversion circuit has an impedance that differs between when current flows in a forward direction in which a side of the terminal defines an upstream side, and when current flows in a direction opposite to the forward direction; and
the impedance of the impedance conversion circuit differs between when the control signal rises and falls to produce a difference in a time constant of the time-constant circuit.

6. The switching converter according to claim 5, wherein the impedance conversion circuit includes:
a first resistor; and
a series-connected circuit including a second resistor and a rectifier; wherein
the first resistor and the series-connected circuit are connected in parallel.

7. The switching converter according to claim 5, wherein the impedance conversion circuit includes:
a first resistor; and
a series-connected circuit including a first capacitor and a rectifier; wherein
the first resistor and the series-connected circuit are connected in parallel.

8. A switching converter, comprising:
first input/output portions to which a first voltage is applied and second input/output portions to which a second voltage, which is lower than the first voltage, is applied;
a switch circuit including first and second switch groups, each including n, where n is an integer that is greater than or equal to 2, switches connected in series, that are connected in series between the first input/output portions in order of the first switch group and the second switch group from one of the first input/output portions that is at a lower potential side;
an inductor connected to one of the second input/output portions that is at a higher potential side and connected in series with the first switch group and the second switch group between the second input/output portions;
a first capacitor connected between the second input/output portions and connected in parallel to the first switch group;
a second capacitor connected between the first input/output portions and connected in parallel to the switch circuit;
a snubber circuit including snubber capacitors respectively connecting mth ones, where 1≤m≤n−1, of connection points between the switches of the first switch group and connection points between the switches of the second switch group from a connection point between the first switch group and the second switch group;
a controller configured or programmed to turn off a gate terminal of each of the switches in the first and second switch groups; and
2n−2 voltage-control variable capacitors respectively connected to a stage preceding the gate terminals of the 2n switches connected in the first and second switch groups excluding the switch closest to the high potential side and the switch closest to the low potential side; wherein
the controller is configured or programmed to detect voltages at the snubber capacitors and a voltage at the second capacitor and adjusts a time at which the gate terminal of each of the switches is turned off based on the voltages at the snubber capacitor and the voltage at the second capacitor.

9. The switching converter according to claim 8, wherein the controller is configured or programmed to output control signals simultaneously to the gate terminals of the 2n−2 switches connected to the voltage-control capacitors and outputs instruction value signals of adjustment voltages applied to the 2n−2 voltage-control variable capacitors.

10. The switching converter according to claim 8, further comprising:
    a terminal to which a control signal of the controller is input;
    an impedance conversion circuit connected between the terminal and a corresponding one of the voltage-control variable capacitors; and
    a time-constant circuit including the impedance of the impedance conversion circuit and capacitance of the voltage-control variable capacitor; wherein
    the impedance conversion circuit has an impedance that differs between when current flows in a forward direction in which a side of the terminal defines an upstream side, and when current flows in a direction opposite to the forward direction; and
    the impedance of the impedance conversion circuit differs between when the control signal rises and falls to produce a difference in a time constant of the time-constant circuit.

11. The switching converter according to claim 10, wherein the impedance conversion circuit includes:
    a first resistor; and
    a series-connected circuit including a second resistor and a rectifier; wherein
    the first resistor and the series-connected circuit are connected in parallel.

12. The switching converter according to claim 10, wherein the impedance conversion circuit includes:
    a first resistor; and
    a series-connected circuit including a first capacitor and a rectifier; wherein
    the first resistor and the series-connected circuit are connected in parallel.

13. A switching converter, comprising:
    first input/output portions to which a first voltage is applied and second input/output portions to which a second voltage, which is lower than the first voltage, is applied;
    a switch circuit including first and second switch groups, each including n, where n is an integer that is greater than or equal to 2, switches connected in series, that are connected in series between the first input/output portions in order of the first switch group and the second switch group from one of the first input/output portions that is at a lower potential side;
    an inductor connected to one of the second input/output portions that is at a higher potential side and connected in series with the first switch group and the second switch group between the second input/output portions;
    a first capacitor connected between the second input/output portions and connected in parallel to the first switch group;
    a second capacitor connected between the first input/output portions and connected in parallel to the switch circuit;
    a snubber circuit including snubber capacitors respectively connecting mth ones, where 1≤m≤n−1, of connection points between the switches of the first switch group and connection points between the switches of the second switch group from a connection point between the first switch group and the second switch group;
    a controller configured or programmed to turn off a gate terminal of each of the switches in the first and second switch groups;
    2n−2 voltage-control variable capacitors respectively connected to a stage preceding the gate terminals of the 2n switches connected in the first and second switch groups excluding the switch closest to the high potential side and the switch closest to the low potential side; and
    a voltage adjustment circuit that applies adjustment voltages to the 2n−2 voltage-control variable capacitors based on voltages at the capacitors.

14. The switching converter according to claim 13, wherein the voltage adjustment circuit is provided for each of the snubber capacitors corresponding to the switches connected to the 2n−2 voltage-control variable capacitors.

15. The switching converter according to claim 13, wherein the voltage adjustment circuit includes:
    a voltage detector to detect voltage at the corresponding snubber capacitor;
    a feedback circuit to cause a light or magnetic converter to output in accordance with the voltage at the snubber capacitor; and
    a voltage generator to generate the adjustment voltage applied to the corresponding voltage-control variable capacitor in accordance with the output of the light or magnetic converter.

16. The switching converter according to claim 13, further comprising:
    a terminal to which a control signal of the controller is input;
    an impedance conversion circuit connected between the terminal and a corresponding one of the voltage-control variable capacitors; and
    a time-constant circuit defined by the impedance of the impedance conversion circuit and a capacitance of the voltage-control variable capacitor; wherein
    the impedance conversion circuit has an impedance that differs between when current flows in a forward direction in which a side of the terminal defines an upstream side, and when current flows in a direction opposite to the forward direction; and
    the impedance of the impedance conversion circuit differs between when the control signal rises and falls to produce a difference in a time constant of the time-constant circuit.

17. The switching converter according to claim 16, wherein the impedance conversion circuit includes:
    a first resistor; and
    a series-connected circuit including a second resistor and a rectifier; wherein
    the first resistor and the series-connected circuit are connected in parallel.

18. The switching converter according to claim 16, wherein the impedance conversion circuit includes:
    a first resistor; and
    a series-connected circuit including a first capacitor and a rectifier; wherein
    the first resistor and the series-connected circuit are connected in parallel.

* * * * *